United States Patent
Xu et al.

(10) Patent No.: US 10,360,750 B2
(45) Date of Patent: Jul. 23, 2019

(54) SYSTEMS AND METHODS FOR PATTERN GENERATION AND SECURITY FEATURES

(71) Applicant: Capital One Services, LLC, McLean, VA (US)

(72) Inventors: Cheng Xu, San Francisco, CA (US); Andrew Viny, San Francisco, CA (US); Janak Dadhaniya, San Francisco, CA (US); Carl Cepress, Santa Clara, CA (US); Elwin Ong, Yuba City, CA (US); Daniel Makoski, Palo Alto, CA (US); Michael Philetus Weller, Seattle, WA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/342,933

(22) Filed: Nov. 3, 2016

(65) Prior Publication Data

US 2017/0124796 A1 May 4, 2017

Related U.S. Application Data

(60) Provisional application No. 62/250,313, filed on Nov. 2, 2015.

(51) Int. Cl.
*G07F 7/08* (2006.01)
*G07F 7/12* (2006.01)
*G06K 19/06* (2006.01)
*G06Q 20/34* (2012.01)

(52) U.S. Cl.
CPC ..... *G07F 7/0813* (2013.01); *G06K 19/06046* (2013.01); *G06Q 20/34* (2013.01); *G06Q 20/355* (2013.01); *G07F 7/086* (2013.01); *G07F 7/12* (2013.01)

(58) Field of Classification Search
USPC .......................................... 235/494
See application file for complete search history.

(56) References Cited

U.S. PATENT DOCUMENTS

| 5,946,414 | A | * | 8/1999 | Cass | ..................... G06T 1/0021 382/183 |
| 2005/0021787 | A1 | * | 1/2005 | Kjellman | ........... G07C 9/00039 709/229 |

* cited by examiner

*Primary Examiner* — Rafferty D Kelly
(74) *Attorney, Agent, or Firm* — Finnegan, Henderson, Farabow, Garrett & Dunner, LLP

(57) ABSTRACT

Methods, systems, and articles of manufacture for providing user participatory design as a process to generate unique patterns on transaction cards are disclosed. For example, a system for providing an interactive design environment for designing a transaction card is disclosed. Accordingly, the system may provide for deeper customization of transaction cards through generative patterns curated by designers and informed by end-users. As a result, the patterns on transaction cards may be unique to every user, and these unique patterns may provide additional security functions to cardholders.

20 Claims, 31 Drawing Sheets

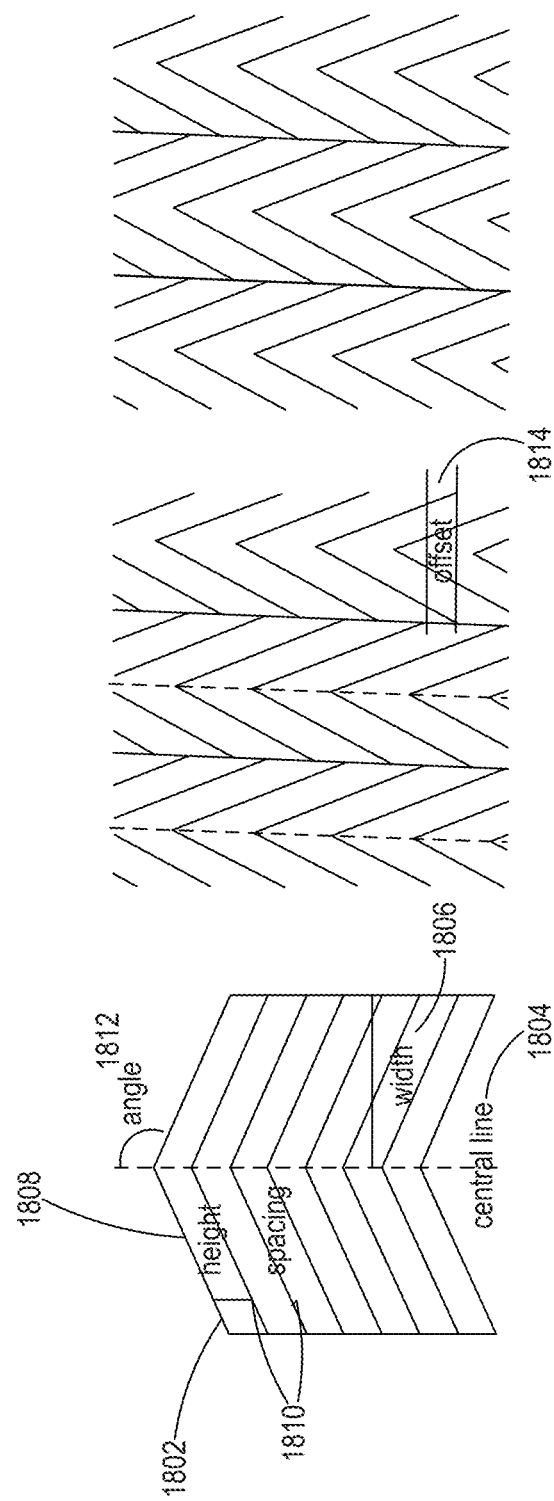

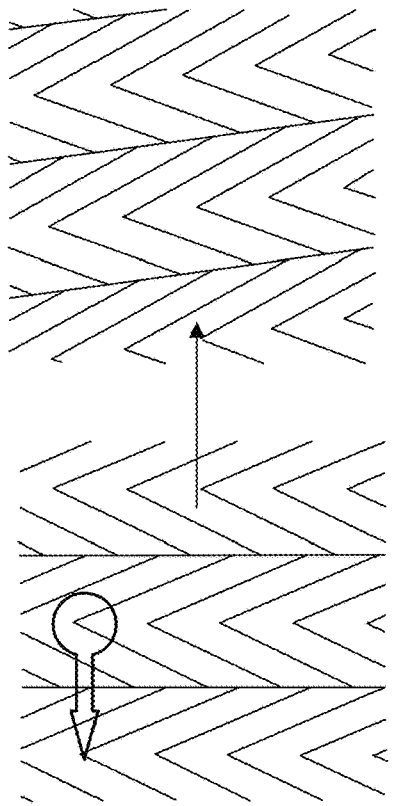
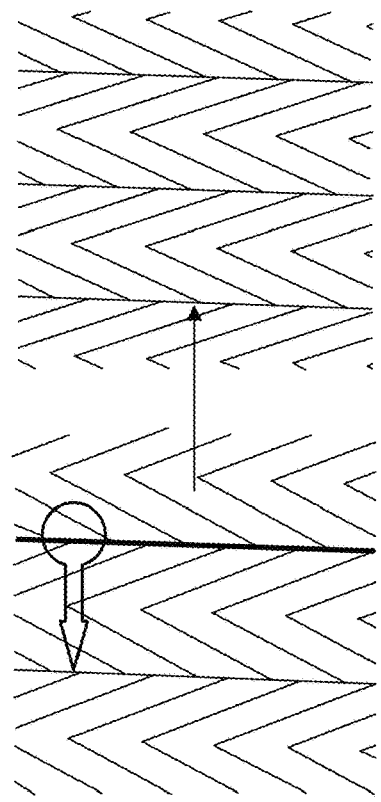

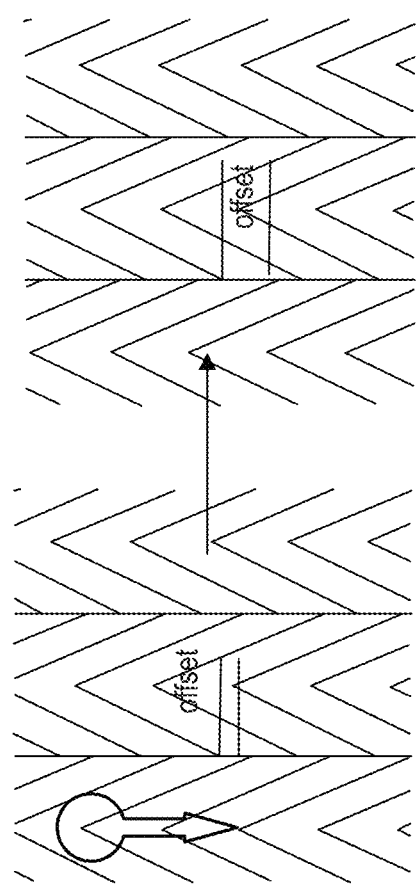

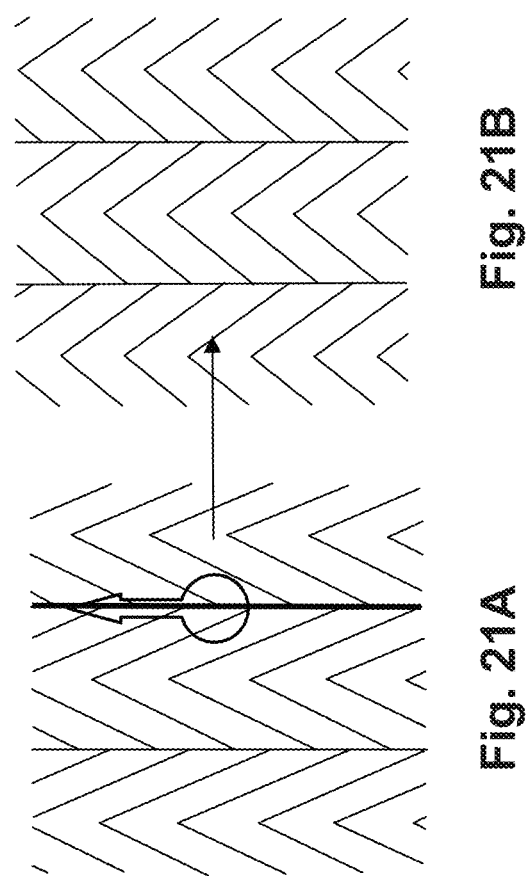

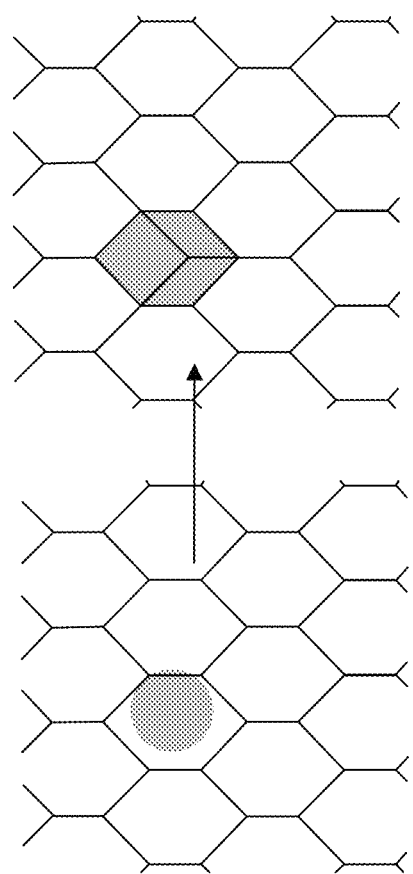

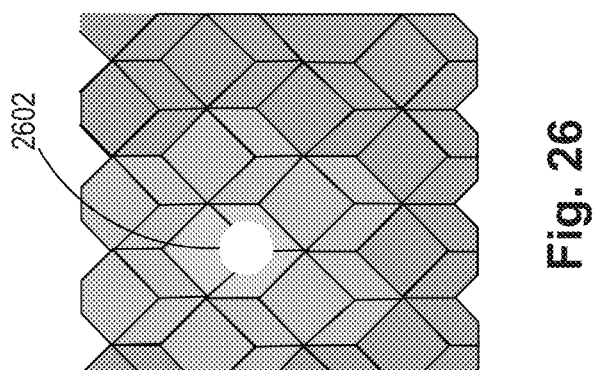

SYSTEMS AND METHODS FOR PATTERN GENERATION AND SECURITY FEATURES

This application claims priority to U.S. Provisional Application No. 62/250,313, filed Nov. 3, 2015, the disclosure of which is hereby incorporated by reference in its entirety.

BACKGROUND

Transaction card designs serve several important functions for both cardholders and card issuers. For example, specific colors may indicate a cardholder status level. Specialty designs may also associate cardholders to specific interest groups, such as an association with a university, company, and/or other organization. Moreover, by providing a variety of designs, card issuers promote card loyalty and increase user utilization, while allowing cardholders to add personality to their transaction cards. This practice is especially common with gift cards and store cards, which often allow even greater customization including co-branding of logos, themed designs, or personalized messages.

Current customization, however, is limited. Users either may choose from a set of predefined graphics and predetermined images or an uploaded personal image. While these options grant users some flexibility in customizing their transaction cards, several disadvantages exist. First, user-uploaded images, while providing the greatest freedom of expression, may result in an appearance that does not reflect the corporate identity of the issuer. Predefined graphics, on the other hand, are typically selected by designers and provide for a consistent visual image, but leave little or limited choices to the users.

Further, customization of transaction cards provides no further functionality beyond mere aesthetics. As shopping experience continues to move online and away from in-person transactions, the risks of potential fraud and phishing attacks increase. Although websites often demand additional security features such as two-step authentications or personalized security image to combat these security risks, the need for additional security features continues to exist.

Moreover, conventional customization systems not only lack functionality, but also are typically spread across multiple platforms that require the use of restricted network connections. As a result, integration of relevant design and/or security information spread across the platforms is inefficient, difficult, or even impossible, requiring excess operator time and processing resources. Further, typical processes for generating unique patterns on transaction cards is subjective and not automated. Such processes are time- and resource-consuming. Therefore, it is desirable to implement a distinctly computer-implemented and enhanced automated process which improves the generation of unique patterns on transaction cards.

The present disclosure is directed at overcoming one or more of the shortcomings set forth above and/or other problems of existing hardware systems.

SUMMARY

Disclosed embodiments include methods, systems, and articles of manufacture configured to, for example, provide an enhanced user automated participatory design as a process to generate unique patterns on transaction cards. Accordingly, the exemplary embodiments support deeper customization of transaction cards through generative patterns curated by designers and informed by end-users. As a result, the patterns on transaction cards may be unique to every user. In some embodiments, these unique patterns may provide additional security functions to the cardholders.

In one embodiment, a system for providing an interactive design environment for designing a transaction card is disclosed. The system may receive data associated with a user. The system may generate a unique identifier using the received data. Using the generated unique identifier, the system may generate an interactive graphical pattern comprising a plurality of predefined geometric shapes. The system may receive user input altering a first portion of the interactive graphical pattern. Based on the changes in the first portion of the interactive graphical pattern, the system may automatically regenerate a second portion of the interactive graphical pattern. The system may initiate application of the interactive graphical pattern onto a surface of a transaction card.

In one aspect, the system may check the interactive graphical pattern against existing patterns to ensure uniqueness. The system may also consider fabrication constraints when generating the interactive graphical pattern. In another aspect, the interactive graphical pattern may comprise a plurality of nodes and lines. In some of the embodiments, the system may also decode the interactive graphical pattern to extract the unique identifier.

In another embodiment, a computer-implemented method for providing an interactive design environment for designing a transaction card is disclosed. In one aspect, the method may include receiving data associated with a user. The method may also include generating a unique identifier using the received data. The method may also include using the unique identifier to generate an interactive graphical pattern comprising a plurality of predefined geometric shapes. The method may include receiving user input altering a first portion of the interactive graphical pattern. The method may include automatically regenerating a second portion of the interactive graphical pattern. The method may include initiating application of the interactive graphical pattern onto a surface of a transaction card.

In another aspect, the method may include checking the interactive graphical pattern against existing patterns to ensure uniqueness. The method may also include considering fabrication constraints when generating the interactive graphical pattern. In a further aspect, the interactive graphical pattern may comprise a plurality of nodes and lines. In other aspects, the method may also include decoding the interactive graphical pattern to extract the unique identifier.

In a further embodiment, a non-transitory computer-readable medium for providing an interactive design environment for designing a transaction card is disclosed. In one aspect, the non-transitory computer-readable medium may include a processor to perform a method. The method may include receiving data associated with a user. The method may also include generating a unique identifier using the received data. The method may also include using the unique identifier to generate an interactive graphical pattern comprising a plurality of predefined geometric shapes. The method may include receiving user input altering a first portion of the interactive graphical pattern. The method may include automatically regenerating a second portion of the interactive graphical pattern. The method may include initiating application of the interactive graphical pattern onto a surface of a transaction card.

In another aspect, the non-transitory computer-readable medium may perform a method including checking the interactive graphical pattern against existing patterns to ensure uniqueness. The method may also include considering fabrication constraints when generating the interactive graphical pattern. In a further aspect, the interactive graphical pattern may comprise a plurality of nodes and lines. In other aspects, the non-transitory computer-readable medium may perform a method including decoding the interactive graphical pattern to extract the unique identifier.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIGS. 18A-18C are illustrations of an exemplary method for generating a chevron pattern, consistent with disclosed embodiments.

FIGS. 19A-19D are illustrations of exemplary methods for interacting with a chevron pattern, consistent with disclosed embodiments.

FIGS. 20A-20B are illustrations of another exemplary method for interacting with a chevron pattern, consistent with disclosed embodiments.

FIGS. 21A-21B are illustrations of another exemplary method for interacting with a chevron pattern, consistent with disclosed embodiments.

FIGS. 24A-24B are illustrations of an exemplary method for interacting with a cube pattern, consistent with disclosed embodiments.

FIG. 26 is an illustration of another exemplary method for interacting with a cube pattern, consistent with disclosed embodiments.

DESCRIPTION OF THE EMBODIMENTS

Disclosed embodiments are directed to, among other things, providing an interactive design environment for producing transaction cards unique to each user. In particular, disclosed embodiments may provide a design environment for customizing transaction cards with unique visual patterns curated by designers but personalized by each user. The resulting transaction cards provide, among other things, a consistent visual image uniquely tied to the user such that the generated pattern is capable of providing additional security functions to the cardholders.

Reference will now be made in detail to exemplary embodiments, examples of which are illustrated in the accompanying drawings and disclosed herein. Whenever convenient, the same reference numbers will be used throughout the drawings to refer to the same or like parts.

Figure 1:
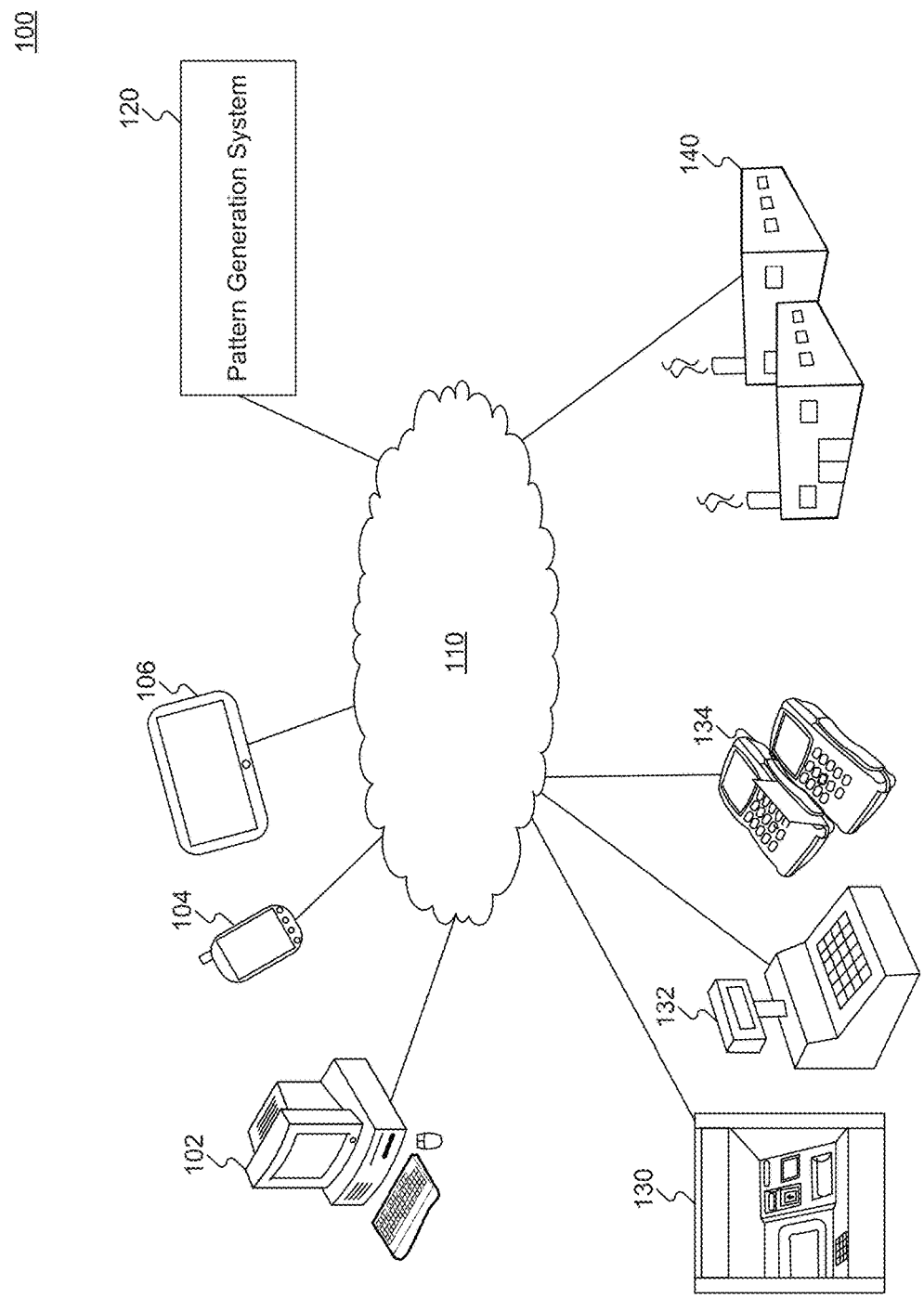
FIG. 1 is a diagram of an exemplary system environment for providing an interactive design environment for designing a transaction card, consistent with disclosed embodiments.

FIG. 1 is a diagram of an exemplary system 100 for performing one or more operations consistent with the disclosed embodiments. Components of system 100 may include computing systems configured to provide an interactive design environment for designing a transaction card, consistent with disclosed embodiments. Components of system 100 may include one or more computing devices, such as computers, web servers, general-purpose servers, authentication servers, or the like. System 100 may further include memory for storing data and/or software instructions, such as databases, memory devices, or the like, and may include other known computing components. Components of system 100 may be configured to communicate with one or more components of system 100 including, but not limited to, user devices 102, 104, and 106, pattern generation system 120, financial devices 130, 132, 134, and manufacturing system 140.

As shown in FIG. 1, system 100 may include user devices 102, 104, or 106. User devices 102, 104, or 106 may include, but is not limited to, a general-purpose computer, computer cluster, terminal, mainframe, mobile computing device, or other computer device capable of receiving user input. As an additional example, a mobile computing device may include, but is not limited to, a mobile phone, smartphone, personal digital assistant, tablet, or laptop. User devices 102, 104, and 106 may be connected to a network such as network 110.

Network 110, in some embodiments, may comprise one or more interconnected wired or wireless data networks. Network 110 may comprise any type of computer networking arrangement used to exchange data. For example, network 110 may be implemented as the Internet, a wired Wide Area Network (WAN), a wired Local Area Network (LAN), a wireless LAN (e.g., IEEE 802.11, Bluetooth, etc.), a wireless WAN (e.g., WiMAX), a private data network, virtual private network using a public network, and/or other suitable connection(s) that enables system 100 to send and receive information between the components of system 100.

Pattern generation system 120 may be a computing system configured to generate patterns for transaction cards consistent with disclosed embodiments. Pattern generation system 120 may be operated, for example, by card issuers, including but not limited to, financial institutions, retailers, or the like. In one embodiment, pattern generation system 120 may include one or more computing devices, memory for storing data and/or software instructions, and may include other known computing components. Pattern generation system 120 may be configured to communicate with one or more components of system 100, such as user devices 102, 104, or 106, financial devices 130, 132, or 134, and/or manufacturing system 140. Pattern generation system 120 may be configured to provide interactive patterns via an interface accessible by users over a network including, but not limited to, the Internet. For example, pattern generation system 120 may include a web server that hosts a web page accessible through network 110 by user devices 102, 104, or 106. The web page may, for example, display an interactive pattern and receive user inputs (e.g., user edits to the interactive pattern) through an input device. In some embodiments, client devices 102, 104, or 106 may execute an application that communicates with pattern generation system 120, displays the interactive pattern on its display through a graphic user interface, and receives user inputs (e.g., user edits to the interactive pattern) through an input device.

Financial devices 130, 132, or 134 may include automated teller machine (ATM) 130, point-of-sale (POS) device 132, bank terminal 134, or the like. Financial devices 130, 132, 134 may be located, for example, at banks, retailers, restaurants, or any place that accepts transaction cards, such as debit cards, credit cards, prepaid cards, gift cards, royalty cards, or any other known transaction cards. According to some embodiments, financial devices 130, 132, or 134 may be configured with additional security features capable of authenticating users, authorizing transactions, etc. based on visual patterns on the surface of transaction cards generated according to disclosed embodiments.

Manufacturing system 140 may be a system configured to manufacture transaction cards according to methods known to those skilled in the art. During manufacturing, manufacturing system 140 may be configured to use ultraviolet (UV) printing, laser etching, or other known methods, to permanently reproduce patterns generated according to disclosed embodiments onto a surface of the transaction cards. In some of the embodiments, manufacturing system 140 may communicate with pattern generation system 120 via network 110 to provide fabrication constraints related to the methods of manufacturing utilized by the manufacturing system 140. Manufacturing system 140 may also receive data, including pattern designs, from pattern generation system 120 to produce transaction cards with unique patterns.

It is to be understood that the configuration and boundaries of the functional building blocks of system 100 have been arbitrarily defined herein for the convenience of the description. Alternative boundaries may be defined so long as the specified functions and relationships thereof are appropriately performed. For example, pattern generation system 120 may constitute a part of components of system 100 other than those specifically described or may constitute a part of multiple components of system 100. Such alternatives fall within the scope and spirit of the disclosed embodiments.

Figure 2:
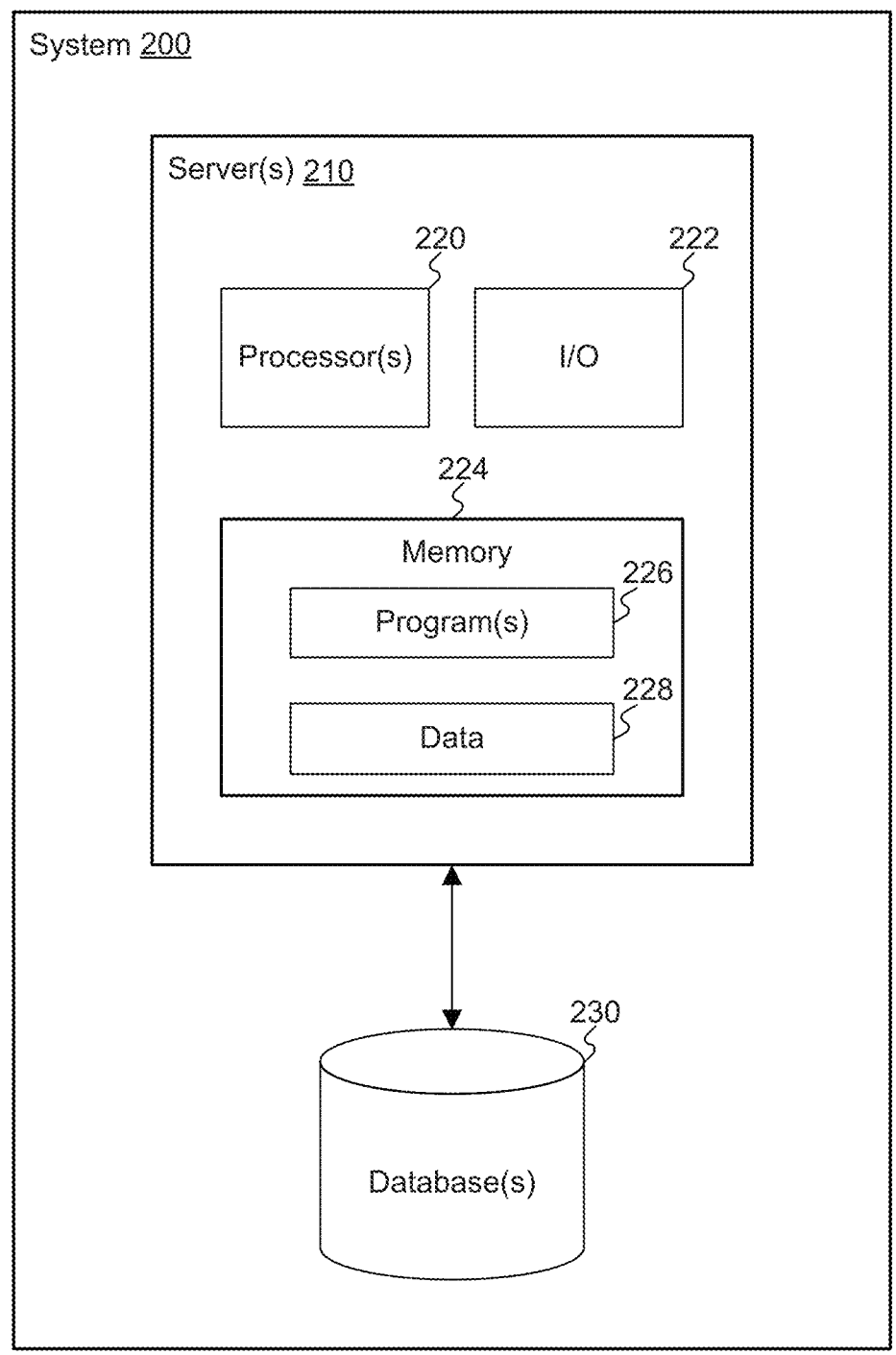
FIG. 2 is a diagram of another exemplary system for providing an interactive design environment for designing a transaction card, consistent with disclosed embodiments.

FIG. 2 is a diagram of another exemplary system for providing an interactive design environment for designing a transaction card, consistent with disclosed embodiments. Exemplary system 200 or variations thereof may be implemented by components of system 100 (shown and not shown), including pattern generation system 120, financial devices 130, 132, 134, manufacturing system 140, and/or user device 102, 104, or 106. In one embodiment, system 200 may include a server 210 having one or more processors 220, one or more input/output (I/O) devices 222, and one or more memories 224. In some embodiments, server 210 may take the form of a mobile computing device, general-purpose computer, a mainframe computer, or any combination of these components. Alternatively, server 210 may be configured as a particular apparatus, embedded system, dedicated circuit, and the like based on the storage, execution, and/or implementation of the software instructions that perform one or more operations consistent with the disclosed embodiments. According to some embodiments, server 210 may comprise web servers or similar computing devices that generate, maintain, and provide web sites consistent with the disclosed embodiments. Server 210 may be standalone, or it may be part of a subsystem, which may be part of a larger system. For example, server 210 may represent distributed servers that are remotely located and communicate over a network, such as network 110. Server 210 may correspond to a server within network 110, or separately to any server or computing device included in system 100.

Processor 220 may include one or more known processing devices. The disclosed embodiments are not limited to any type of processor configured in server 210. Input/output (I/O) devices 222 may be one or more devices configured to allow data to be received and/or transmitted by server 210. I/O devices 222 may include one or more digital communication devices that allow server 210 to communicate with other machines and devices, such as other components of pattern generation system 120, financial devices 130, 132, or 134, client devices 102, 104, or 106, or manufacturing system 140.

Memory 224 may include one or more storage devices configured to store instructions used by processor 220 to perform functions related to disclosed embodiments. For example, memory 224 may be configured with one or more software instructions, such as program(s) 226 that may perform one or more operations when executed by processor 220. The disclosed embodiments are not limited to separate programs or computers configured to perform dedicated tasks. For example, memory 224 may include a single program 226 that performs the functions of the server 210, or program 226 could comprise multiple programs. Additionally, processor 220 may execute one or more programs located remotely from server 210. For example, pattern generation system 120, financial devices 130, 132, or 134, client devices 102, 104, or 106, or manufacturing system 140, may via server 210 access one or more remote programs that, when executed, perform functions related to certain disclosed embodiments.

Server 210 may also be communicatively connected to one or more databases 230. Server 210 may be communicatively connected to database 230 through network 110. Database 230 may include one or more memory devices that store information and are accessed and/or managed through server 210. Systems and methods of disclosed embodiments, however, are not limited to separate databases. In one aspect, system 200 may include database 230. Alternatively, database 230 may be located remotely from the system 200. Database 230 may include computing components (e.g., database management system, database server, etc.) configured to receive and process requests for data stored in memory devices of database 230 and to provide data from database 230.

Figure 3:
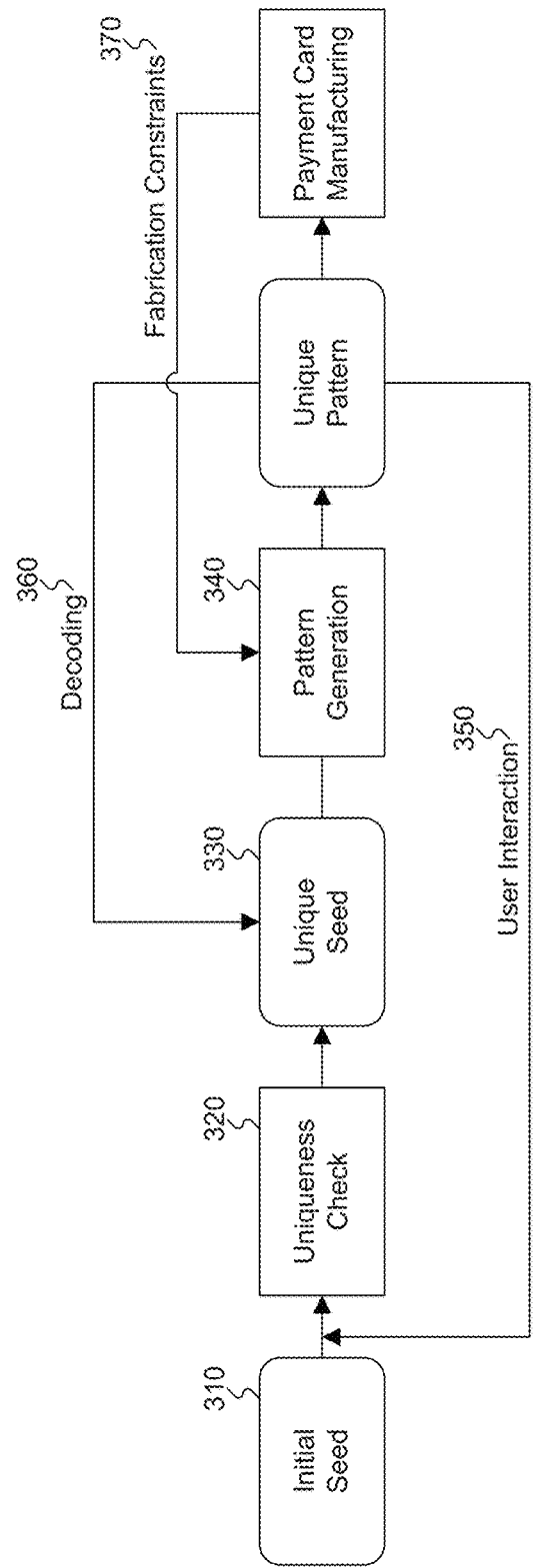
FIG. 3 is a flowchart illustrating an exemplary method for providing an interactive design environment for designing a transaction card, consistent with disclosed embodiments.
Figure 4:
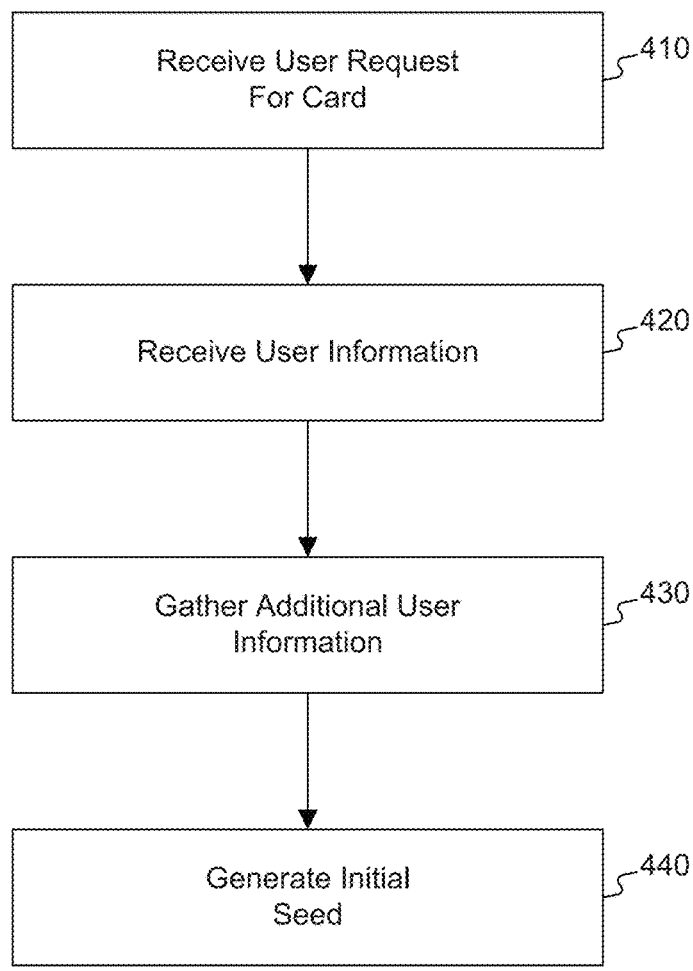
FIG. 4 is a flowchart illustrating an exemplary method for generating an initial seed, consistent with disclosed embodiments.

FIG. 3 shows a flowchart illustrating an exemplary interactive design process 300 for generating a unique pattern for a transaction card, consistent with disclosed embodiments. In step 310, pattern generation system 120 may generate an initial seed or identifier associated with a user. In some embodiments, the initial seed may represent the first instance of data capable of personalizing the interactive patterns curated by designers to the user. Thus, the initial seed may be any set of numbers associated with the user. For example, the sixteen-digit account number on the user's transaction card may be used as the initial seed. Alternatively, pattern generation system 120 may generate an initial seed independent of the account number. For example, the initial seed may be a numerical representation of the user's full legal name. In still other embodiments, the initial seed may be a numerical representation of multiple sources of data associated with the user. While pattern generation system 120 may generate an initial seed using several different processes, one exemplary initial seed generation process is shown in FIG. 4.

In step 320, pattern generation system 120 may compare the initial seed with existing or known identifiers in the database to ensure that the initial seed is unique. Pattern generation system 120 may also modify the initial seed to generate a unique identifier that may be associated with the user (step 330). For example, if the initial seed comprises a numerical representation of the user's name, and pattern generation system 120 identifies existing or known identifiers in the database for another user of the same name, pattern generation system 120 may generate a hash value of the user's name and birthdate. Pattern generation system 120 may then use the unique identifier as a seed in step 340 to generate the first instance of a unique pattern associated with the user. In step 350, pattern generation system 120 may receive user interaction with the unique pattern via, e.g., a user interface displayed on user device(s) 102, 104, 106. For example, in some of the embodiments, pattern generation system 120 may receive user input from a user device(s) 102, 104, 106 and make bottom-up changes to the graphics, which preserves the high-level design languages curated by the designers while allowing the user to participate in customizing the pattern. Additional details related to these exemplary steps are further described with respect to FIGS. 5 and 6.

Any modification done through the user interaction may be checked for uniqueness, and the system may distinctly automatically populate the design canvas with generated patterns consistent with the design language to ensure both continuity of design and uniqueness. Thus, in some embodiments, the unique pattern may be decoded to extract the unique seed (step 360) during the design process. For example, pattern generation system 120 may encode each digit of the unique identifier to a location on the transaction card and generate the pattern around these specific locations (e.g., locations 1, 2, and 3 of FIG. 8A). In the process of decoding the unique pattern, pattern generation system 120 may process the patterns to identify these key locations to extract the unique seed as the user manipulates the design. In some of the embodiments, pattern generation system 120 may acquire an image of the pattern and use various image-processing techniques to extract the unique seed. This process may provide an enhanced security feature based on the appearances of the pattern.

In some of the embodiments, pattern generation step 340 may further take into consideration various parameters from manufacturing system 140 (step 370). For example, in some of the embodiments, pattern generation system 120 may receive manufacturing parameters from manufacturing system 140. The parameters may be manufacturing constraints or limitations associated with certain methods of manufacturing, such as UV printing, laser etching, or the like. In other embodiments, the parameters may be security features provided by manufacturing system 140. Additional details related to these exemplary steps are further described with respect to FIG. 7.

FIG. 4 shows a flowchart of an exemplary initial seed generation process 400, consistent with disclosed embodiments. According to one embodiment, the initial seed generation process may begin with pattern generation system 120 receiving a user request for a transaction card from a user device(s) 102, 104, 106. For example, a user may operate user device(s) 102, 104, 106 to access a website associated with an entity that issues transaction cards (e.g., a financial service provider) to users in order to request a transaction card. In other examples, a user may operate user device(s) 102, 104, 106 to request the transaction card via a software application associated with the card issuer installed on user device(s) 102, 104, 106. Through the website or application, the user may operate user device 102, 104, 106 to provide various identifying information associated with the user (e.g., unique ID, name, etc.), which may be received or otherwise accessed by pattern generation system 120. In some embodiments, the user may be an existing customer desiring to acquire a replacement card, and pattern generation system 120 may already have access to the various identifying information of the user. For example, the user may be an existing customer operating user device(s) 102, 104, 106 to access a website or use a software application associated with the card issuer to request a transaction card without identifying information beyond, for example, completing a customer login process or the like. The software application may be a web application or an application associated with a transaction card issuer on the user device(s) 102, 104, 106. Because the user is an existing customer, the identifying information may be available within the database of the transaction card issuer. Alternatively, the pattern generation system 120 may access external databases, such as commercially available databases, credit-reporting agencies, or the like to obtain the identifying information.

Pattern generation system 120 may also acquire user information including, but not limited to, the user's full legal name (if not already known), nickname(s), residence address(es), phone number(s), birthdate, favorite color, social security number, etc. A user requesting a transaction card often may also provide other information such as e-mail address, annual income, ownership of property, monthly housing payment, employment status, name of employer, etc. All this information could be used by the pattern generation system 120 to generate the initial seed in step 410.

Further, in step 430, pattern generation system 120 may gather additional information related to the user. In some embodiments, the additional information related to the user may not typically be associated with requesting transaction cards from a card issuer. For example, the additional information may comprise, among other things, the user's personal interests, brand preferences, political affiliations, corporate associations, demographics, and the like. For example, pattern generation system 120 may obtain this information using a survey provided to the user. Alternatively, pattern generation system 120 may have access to the user's social network(s) or commercially available data-mining companies. Alternatives to the user information will be apparent to persons of skill in the relevant art based on the teachings contained herein, and the steps acquiring or gathering user information are not limited to what is disclosed herein and may be accomplished in any order. Such alternatives fall within the scope and spirit of the disclosed embodiments.

In step 440, pattern generation system 120 may take the user information (and/or additional user information) and generate an initial seed based on the gathered information. In some of the embodiments, the initial seed may be a set of pseudo-random numbers generated based on the user information as a seed. Pattern generation system 120 may generate the initial seed based on predetermined algorithms. For example, pattern generation system 120 may generate the initial seed based on a hashing function for producing values of fixed size using user information of an arbitrary size. For example, in some embodiments, the initial seed may comprise a hashed value of the user's full legal name. Alternatively or additionally, the initial seed may be the user's account number or may be determined in conjunction with the account number (e.g., the user's account number may comprise a portion of the initial seed). Moreover, in some of the embodiments, the initial seed may be used as an identifier associated to the user.

Figure 5:
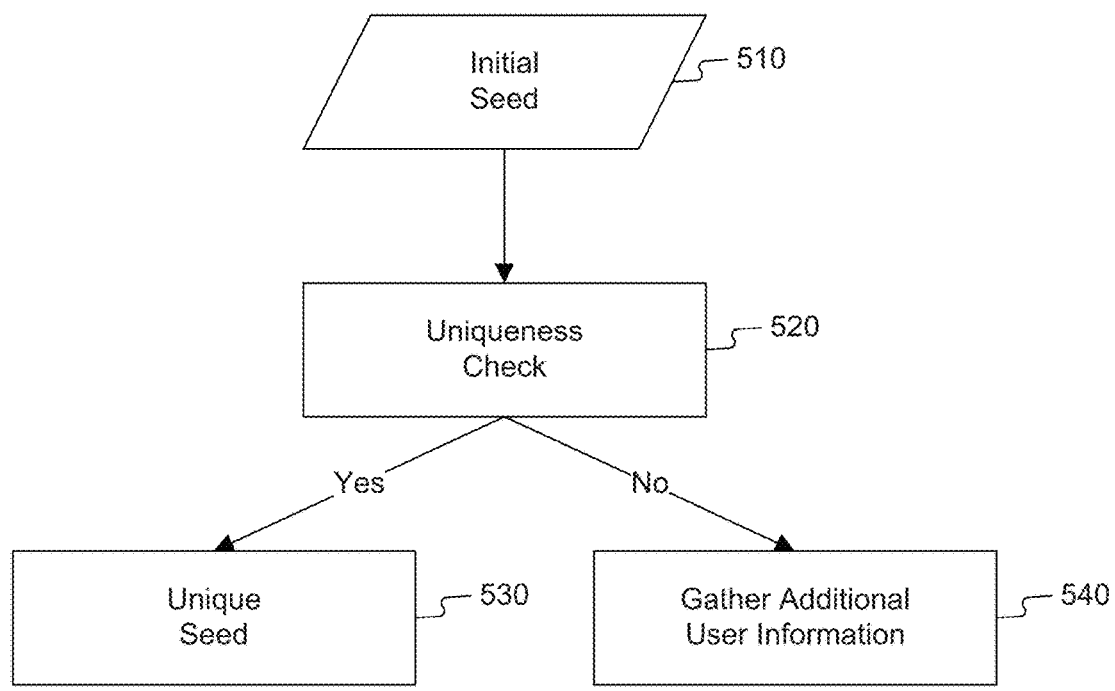
FIG. 5 is a flowchart illustrating an exemplary method for generating a unique seed, consistent with disclosed embodiments.

FIG. 5 shows a flowchart of an exemplary unique seed generation process 500, consistent with disclosed embodiments. For example, pattern generation system 120 may begin in step 510 by accessing an initial identifier, such as the initial seed generated at step 440. In step 520, pattern generation system 120 may compare the initial identifier with known identifiers stored in a database (e.g., database 230) associated with pattern generation system 120. If the initial identifier generated during step 440 is unique (e.g., otherwise distinct from all other known identifiers in the database), the system may designate the initial identifier as a unique seed for generating the pattern (step 530). If after the first iteration, the initial identifier is not unique, pattern generation system 120 may generate another initial identifier (step 540). In some embodiments, pattern generation system 120 may acquire or otherwise access additional information associated with the user to generate another initial seed. Steps 520 and 540 may continue until pattern generation system 120 determines the initial identifier is unique (step 520; Yes) and designates the initial identifier as the unique seed. Through process 500, the system may generate a unique seed associated with the user. The unique seed may be used as a seed to generate the interactive pattern users may influence, as discussed below.

Figure 6:
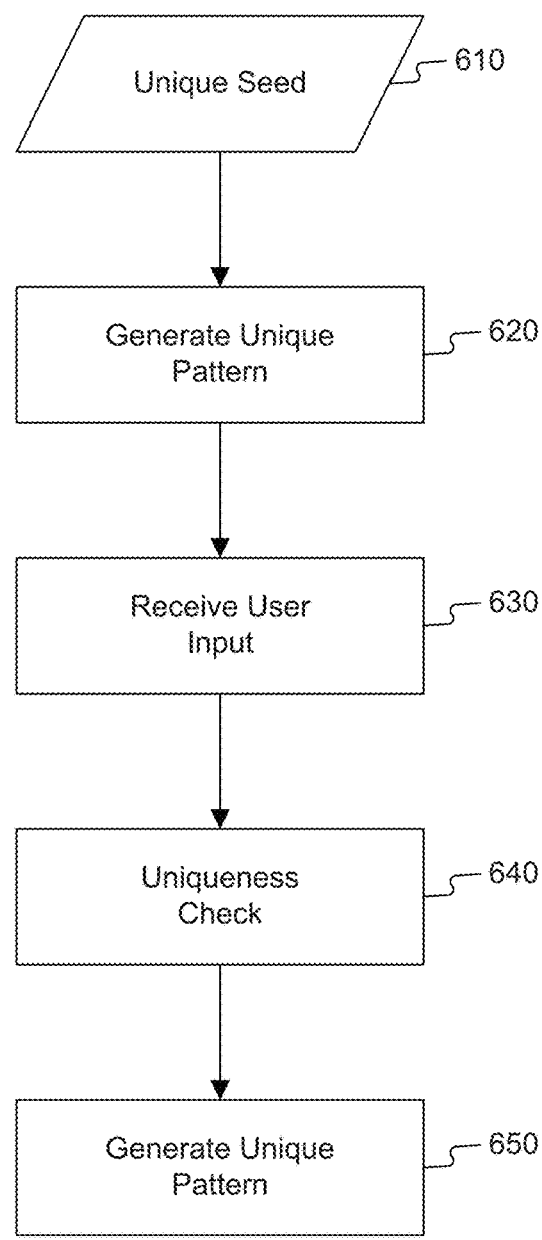
FIG. 6 is a flowchart illustrating an exemplary method for generating an interactive graphical pattern, consistent with disclosed embodiments.

FIG. 6 shows a flowchart of an exemplary unique pattern generation process 600 consistent with disclosed embodiments. In step 610, pattern generation system 120 may access a unique seed (e.g., the unique seed designated in step 530). In step 620, pattern generation system 120 generates a unique pattern, which may be a mathematical visualization of the unique seed. Moreover, the pattern in some of the embodiments may be associated with a specific visual language. For example, the visual language may be pre-defined geometric shapes including, but not limited to, triangles, rhomboids, cubes, hexagons, chevrons, lines, circles, curves, and the like. In some of the embodiments, the pattern comprises a plurality of nodes (see, e.g., elements 802, 804 of FIG. 8) and connecting lines (see, e.g., elements 806, 808 of FIG. 8). Alternatively, the plurality of nodes may be composed of circles, or the connecting lines may be curves. In other embodiments, the pattern comprises a plurality of overlapping geometric shapes. The characteristics of the visual languages, and how they may be used to draw the patterns according to exemplary embodiments, are further described later with respect to FIGS. 8-31.

According to one embodiment, the initial visual language used in generating the initial pattern (step 620) may be preselected, meaning that pattern generation system 120 may automatically select an initial visual language to generate the pattern. Alternatively, a user may operate a user device(s) 102, 104, 106 to select the visual language prior to the generation of the initial pattern or any time before finalizing the pattern. During pattern generation step 620, pattern generation system 120 may populate an interactive canvas displayed on a user device(s) 102, 104, 106 with geometric shapes based on the unique seed according to the selected visual language. In some of the embodiments, the generated pattern may represent a direct graphical mapping of the unique seed. For example, pattern generation system 120 may map each individual digit of the unique identifier to a location on the interactive canvas, which may determine either the locations of selected nodes or the centers of certain graphical shapes. Other alternative mathematical depictions of the unique identifier are also possible depending on the visual language and algorithm.

At this point, the generated pattern may be a unique depiction or representation of the unique identifier, and the user may choose to keep the pattern without further modification. In step 630, however, pattern generation system 120 may receive user interactions from user device(s) 102, 104, 106 to modify the pattern in order to customize the design. In order to provide enhanced user experience, allow customization freedom, and ensure consistent visual aesthetics and functionality, pattern generation system 120 may take the user input from user device(s) 102, 104, 106, and make bottom-up changes to the graphics. In this way, the high-level visual language may be preserved, while at the same time allowing user customization. By maintaining intuitive user interaction with the system, the interaction may not need to be precise and no prerequisite skills may be necessary.

Figure 8A:
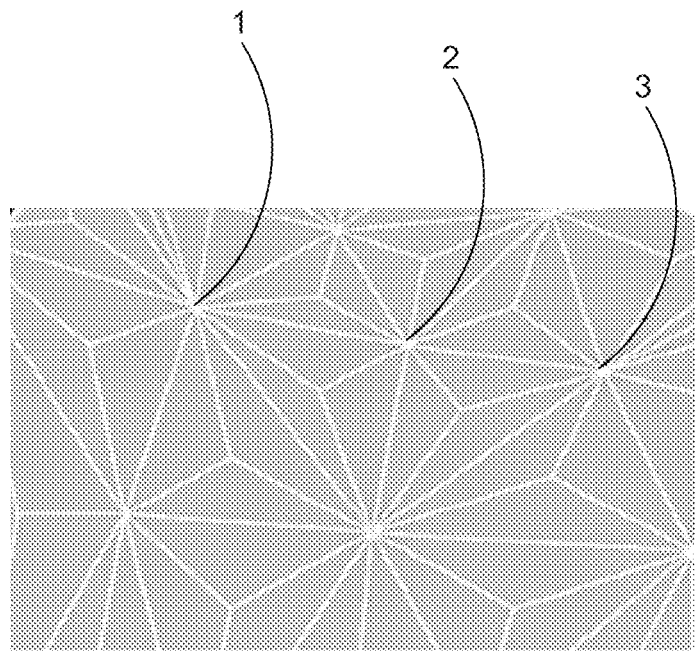
FIGS. 8A-8B are illustrations of exemplary patterns, consistent with disclosed embodiments.
Figure 8B:
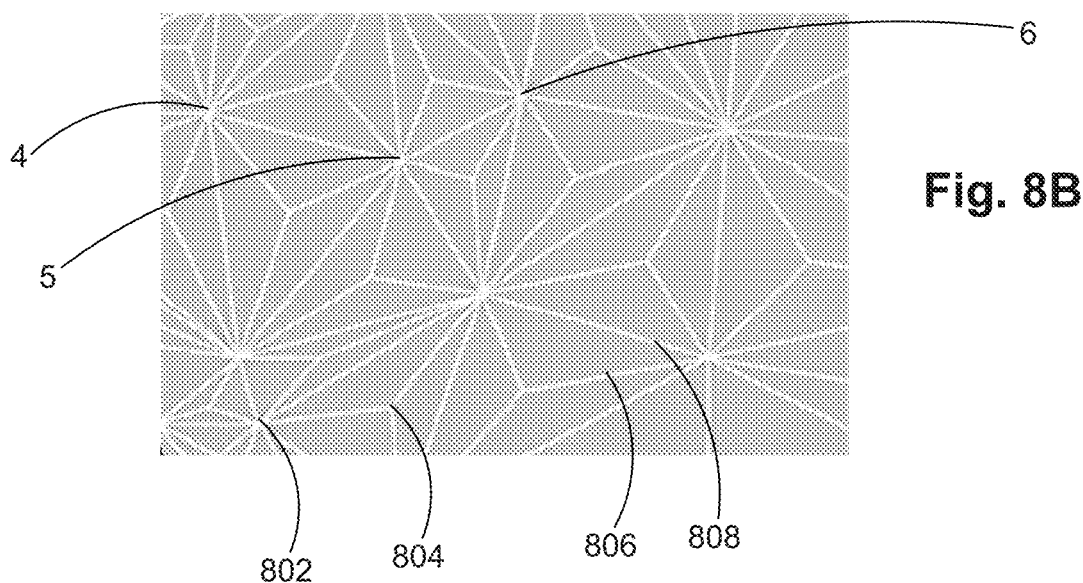
Figure 10:
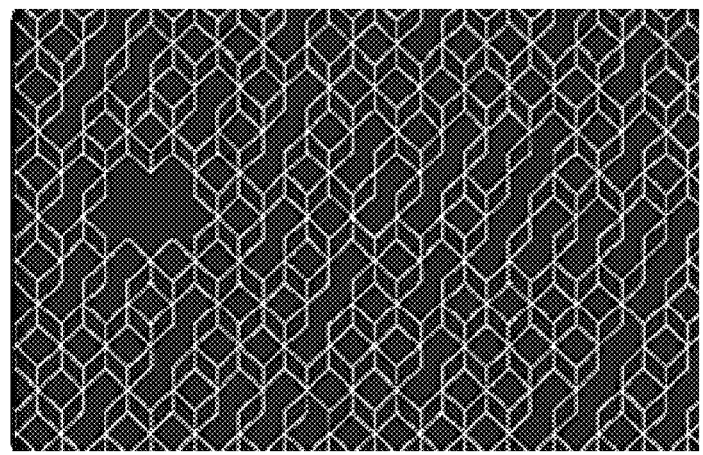
FIG. 10 is an illustration of another exemplary pattern, consistent with disclosed embodiments.

According to some of the embodiments, the user interaction may be selecting a new visual language. For example, the preselected visual language may be triangular shapes having certain number of nodes 802,804 and connecting lines 806, 808 as shown in FIGS. 8A and 8B. The user may operate a user device(s) 102, 104, 106 to select a different visual language such as cubic-like shapes or rhombuses as shown in FIG. 10, and pattern generation system 120 may automatically generate a new pattern using the new visual language.

According to other embodiments, the user interaction may be as simple as swiping across the canvas or explicitly tapping on the nodes or lines. For example, in one aspect, the user may use a finger, stylus, or other known input devices associated with a user device(s) 102, 104, 106, to drag the nodes or lines directly to a different location on the canvas. In another aspect, tapping of the finger or stylus, or other similar user inputs, could add or remove the nodes or lines. For example, user may operate a user device(s) 102, 104, 106 to drag various nodes at locations 1, 2, and 3 of FIG. 8A to different corresponding locations 4, 5, and 6 to result in the pattern depicted in FIG. 8B.

Figure 9A:
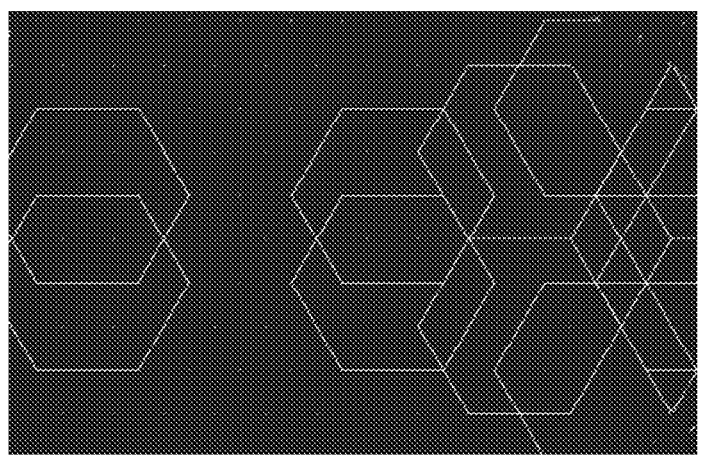
FIGS. 9A-9B are illustrations of other exemplary patterns, consistent with disclosed embodiments.

Alternatively, the user may operate a user device(s) 102, 104, 106 to perform less explicit interactions with the patterns. For example, the user may operate a user device(s) 102, 104, 106 to swipe across the canvas displayed on user device(s) 102, 104, 106, and pattern generation system 120 may receive the user input and automatically fill in the design according to its algorithms. This computer-implement automatic and algorithmic fill may improve the performance and efficiency of design generation. As shown in FIG. 9A, pattern generation system 120 may generate a unique pattern comprising overlapping hexagonal shapes. The user may operate a user device(s) 102, 104, 106 to swipe across a blank area within the canvas (or any area on the canvas), and pattern generation system 120 may receive the user input and automatically populate the canvas with additional hexagonal shapes to result in the pattern depicted in FIG. 9B. Other input devices and methods of inputs may be used as well. For example, the user may use a microphone connected to a user device(s) 102, 104, 106, and pattern generation system 120 could take the audio input to populate the canvas based on the inputted audio waveform.

Other customizations may also be possible including, but not limited to, selecting a different background color, changing line color, or defining canvas regions.

As discussed previously, pattern generation system 120 may make bottom-up changes to the graphics. In some embodiments, pattern generation system 120 may modify the unique seed according to the user input received from a user device(s) 102, 104, 106. The pattern generation system 120 may conduct a uniqueness check to ensure the seed for pattern generation remains unique (step 640). Once the system generates a second unique seed, the pattern generation system 120 may populate the canvas according to the second unique seed. Alternatively, the system may check the pattern for uniqueness.

In other embodiments, pattern generation system 120 may maintain the portion of the pattern representing the unique seed and only alter certain aspects of the pattern that do not represent the unique seed. For example, the generated pattern may comprise two parts. The first part may be a unique pattern generated based on the unique seed according to the disclosed embodiments. For example, the first part of the pattern may encode information and may be unalterable. The second part may be additional design that does not carry any information. For example, the second part may be interactive and be modified for aesthetic purposes. In one aspect, the user interaction would only alter the portion that does not represent the unique seed. Alternatively, the unalterable portion may be security features embedded into the design including, but not limited to, microscopic alphanumeric characters, dots and dashes, bar codes, or the like.

From the user's perspective, the changes may appear intuitive. The user operating a user device(s) 102, 104, 106 may alter a first portion of the graphical pattern. Pattern generation system 120 may receive the alteration, process it, and automatically populate through specialized algorithmic steps a second portion of the graphical pattern to regenerate a unique pattern on the display of the user device(s) 102, 104, 106. For example, as noted above, the user may operate a user device(s) 102, 104, 106 to move the nodes 802, 804 around to different locations, or add or remove the nodes 802, 804. Pattern generation system 120 may automatically populate additional portions of the pattern, such as connecting the nodes with additional lines 806, 808. Alternatively, pattern generation system 120 may differentiate between a first node(s) 802 and a second node(s) 804. In one aspect, a user may operate a user device(s) 102, 104, 106 to move the first node(s) 802, and pattern generation system 120 may automatically populate the second node(s) 804. Because any changes to the appearance directly reflect the user's interaction, the entire process may seem natural to the user. Thus, pattern generation system 120 may preserve the high-level design languages while allowing users to interact with the patterns and personalize the designs for their transaction cards.

Figure 7:
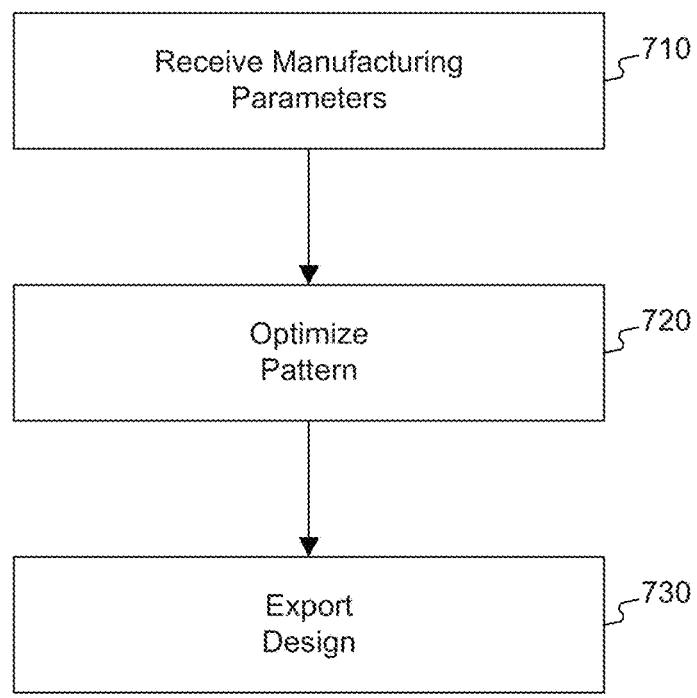
FIG. 7 is a flowchart illustrating an exemplary method for optimizing a pattern for manufacturing, consistent with disclosed embodiments.

FIG. 7 shows a flowchart of an exemplary manufacturing optimization process 700 consistent with disclosed embodiments. In step 710, the pattern generation system 120 receives manufacturing parameters from manufacturing system 140. In some embodiments, the manufacturing parameters may include fabrication constraints associated with a particular manufacturing process including, but not limited to, UV printing or laser etching. For example, a design that would be UV printed on a plastic card may require different optimization of graphics than when laser etched. In some aspects, the fabrication constraints may also include the material type (e.g., plastic or metal) or the card shape, size, margins, or protected areas (e.g., locations of the security chip and/or logo). In other embodiments, the manufacturing parameters may include security features of manufacturing system 140. For example, certain portions of the lines may be microscopic alphanumeric characters, dots and dashes, bar codes, or the like, which could be used as additional security protection.

Process 700 may occur in parallel with process 300-600. For example, having the manufacturing parameters, pattern generation system 120 may optimize the generated patterns in step 720 as part of processing the user input of step 630 so that the generated unique pattern of step 650 complies with the manufacturing parameters associated with the chosen manufacturing processes and/or manufacturing system 140. Multiple manufacturing systems 140 may be involved, and each manufacturing system 140 may use different manufacturing processes with different limitations. One manufacturing system 140 may be configured to process metal cards using laser etching, while another manufacturing system 140 may be configured to process plastic cards using UV printing. In some of the embodiments, pattern generation system 120 may receive specific parameters from a manufacturing system(s) 140, and optimize the line density in order to comply with the specific manufacturing system 140. In other embodiments, pattern generation system 120 may limit the spacing between lines and/or the number of total nodes based on the perimeter received from manufacturing system 140. In step 730, the pattern generation system 120 may export the final design to a format usable by manufacturing system 140, such as vector files or other known file types, and directly communicate the file to manufacturing system 140 via network 110. In a way, the design process could become completely autonomous, eliminating additional adjustments and processing at manufacturing system 140. In sum, the exemplary process 700 may reduce both manufacturing time and cost.

Figure 9B:
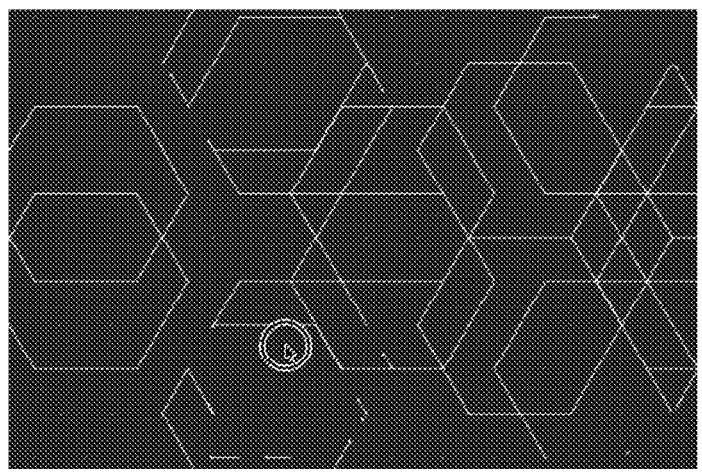
Figure 11E:
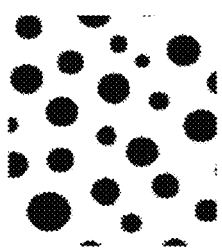
FIGS. 11A-11T are illustrations additional exemplary patterns, consistent with disclosed embodiments.
Figure 11J:
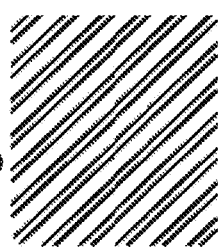
Figure 11O:
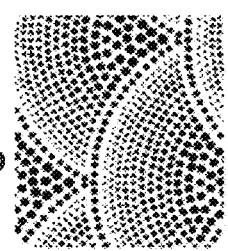
Figure 11T:
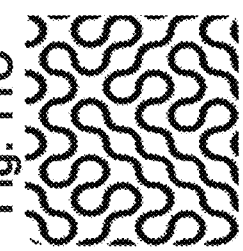
Figure 11D:
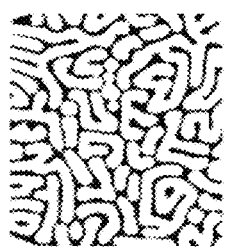
Figure 11I:
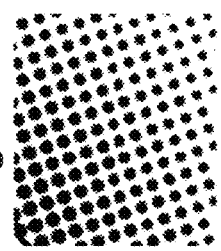
Figure 11N:
Figure 11S:
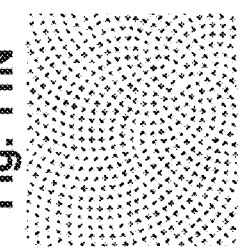
Figure 11C:
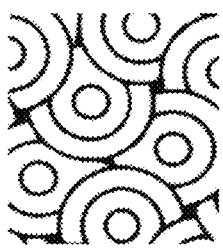
Figure 11H:
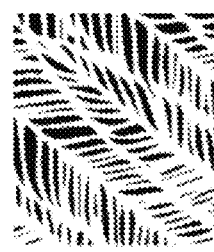
Figure 11M:
Figure 11R:
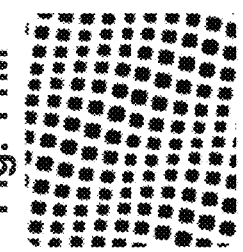
Figure 11B:
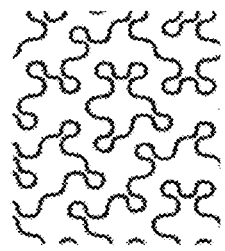
Figure 11G:
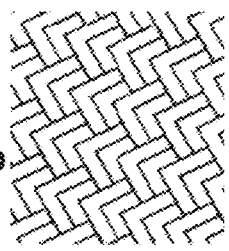
Figure 11L:
Figure 11Q:
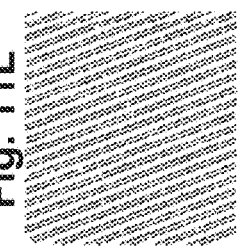
Figure 11A:
Figure 11F:
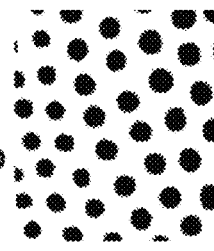
Figure 11K:
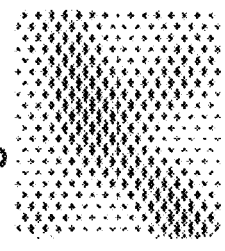
Figure 11P:
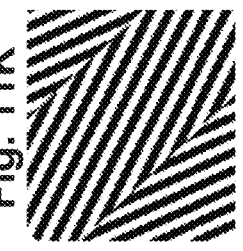

FIGS. 8A and 8B illustrate exemplary patterns having the same visual language, consistent with disclosed embodiments. As shown in FIGS. 8A and 8B, an exemplary visual language may comprise certain predefined geometric shapes such as triangles. The patterns may further comprise nodes 802, 804 and connecting lines 806, 808. In some of the embodiments, the user may operate a user device(s) 102, 104, 106 to change the locations of the nodes or the spacing between the nodes. Pattern generation system 120 may populate the canvas according to the selected visual language and thereby create multiple distinct patterns. In other embodiments, a user may operate a user device(s) 102, 104, 106 to select a different visual language as shown in FIGS. 9A and 9B. FIGS. 9A and 9B illustrates an exemplary visual language may comprise hexagonal shapes. Moreover, the exemplary pattern may comprise overlapping geometric shapes. In some of the embodiments, the user may operate a user device(s) 102, 104, 106 to change the locations of hexagonal shapes. Alternatively, the user may operate a user device(s) 102, 104, 106 to swipe across the canvas as shown in FIG. 9B, and pattern generation system 120 may receive the input and automatically generate pattern according to the received input. FIG. 10 illustrates another exemplary visual language comprising of cubic-like shapes and/or rhombuses. FIGS. 11A-11T further illustrate additional exemplary visual languages, consistent with disclosed embodiments. By having a variety of predefined visual languages, the pattern generation system 120 may generate various patterns for the same unique seed by changing the visual language.

Figure 12B:
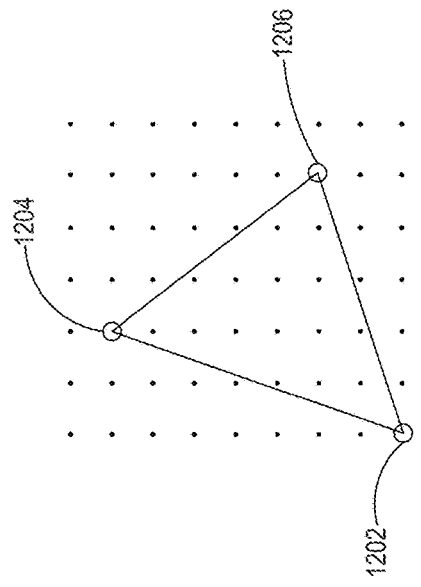
FIGS. 12A-12D are illustrations of an exemplary method for generating a triangle pattern, consistent with disclosed embodiments.
Figure 12D:
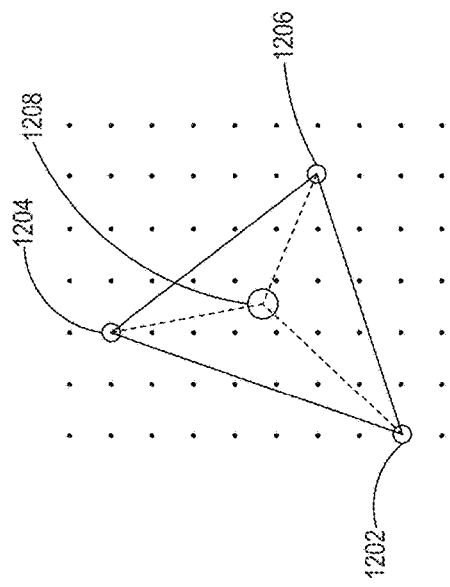
Figure 12A:
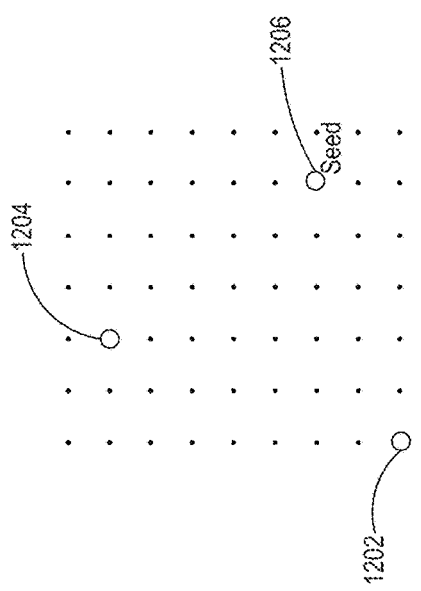
Figure 12C:
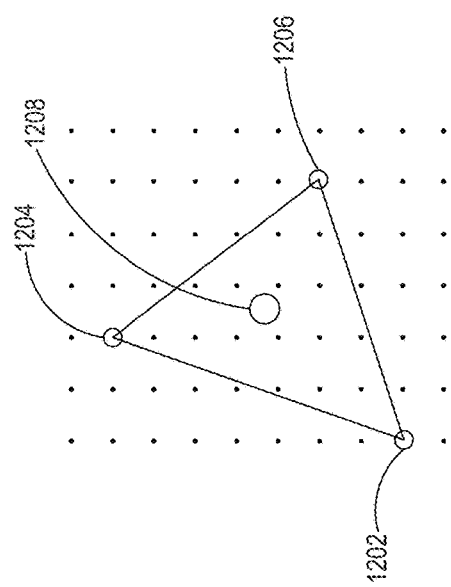

FIGS. 12A to 12D illustrate an exemplary method for generating a triangle pattern using a unique seed consistent with disclosed embodiments. As shown in FIG. 12A, pattern generation system 120 may receive the unique seed and generate nodes 1202, 1204, 1206 on the interactive canvas. The distance between the nodes may be determined according to the manufacturing parameters received from manufacturing system 140. Alternatively, the distance d between the nodes may be greater than a predetermined value R, so that d>R. In some embodiments, pattern generation system 120 may perform Delaunay triangulation on nodes 1202, 1204, 1206 to obtain triangles that do not overlap. In other embodiments, pattern generation system 120 may perform other known triangulation process to obtain the triangle pattern. Alternatively, pattern generation system 120 may optimize the pattern for non-sharp triangles. As shown in FIGS. 12C and 12D, pattern generation system 120 may determine the geometric center 1208 of the triangle pattern and generate connecting lines to connect the nodes 1202, 1204, 1206 to the center 1208.

Figure 13B:
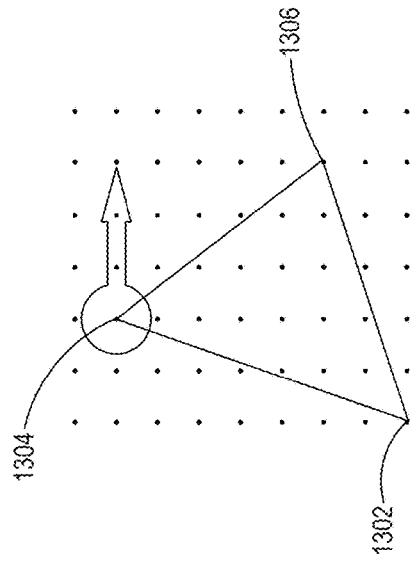
FIGS. 13A-13D are illustrations of an exemplary method for interacting with a triangle pattern, consistent with disclosed embodiments.
Figure 13D:
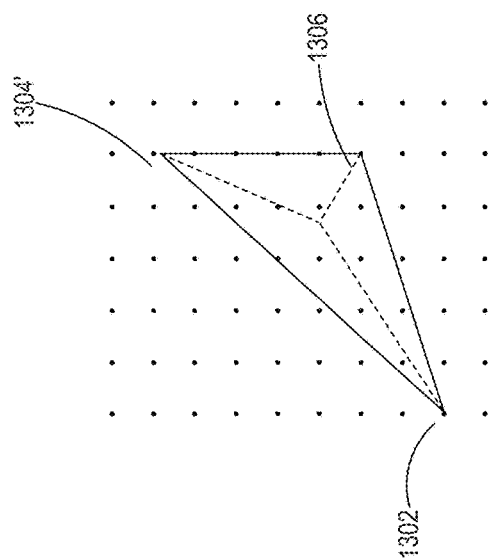
Figure 13A:
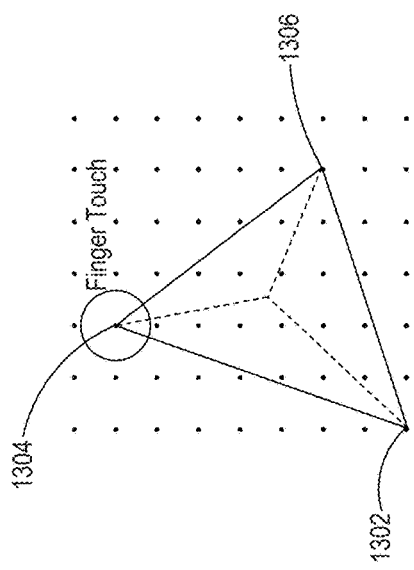

FIGS. 13A to 13D illustrate an exemplary method for moving a node and regenerating a triangle pattern consistent with disclosed embodiments. As shown in FIG. 13A, the user operating a user device(s) 102, 104, 106 may touch a portion of the graphical pattern. Pattern generation system 120 may determine the distances from the surrounding nodes 1302, 1304, 1306 to the touched portion and select the nearest node within a predetermined threshold T. As shown in FIG. 13A, node 1304 is the nearest node. In some embodiments, when a node is selected, pattern generation system 120 may cause the connecting lines to disappear as shown in FIG. 13B. When the user operating a user device(s) 102, 104, 106 releases the selected node 1304, pattern generation system 120 may generate the connecting lines according to the exemplary method described in FIGS. 12A to 12D.

Figure 13C:
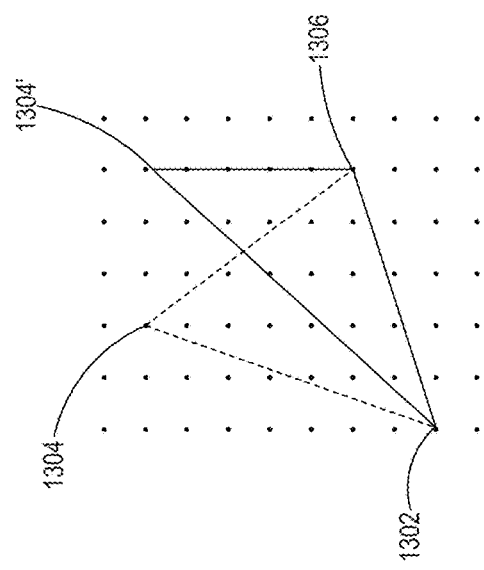

As shown in FIGS. 13B and 13C, the user operating a user device(s) 102, 104, 106 may move the selected node 1304 to a different location 1304' on the interactive canvas. In some embodiments, if the location 1304' has an existing node, pattern generation system 120 may merge the node 1304 with the existing node. In another embodiment, pattern generation system 120 may merge the two nodes if a distance d between the nodes are less than a predetermined value R (d<R). As shown in FIG. 13D, pattern generation system 120 may generate the internal connecting lines consistent with disclosed embodiments.

Figure 14B:
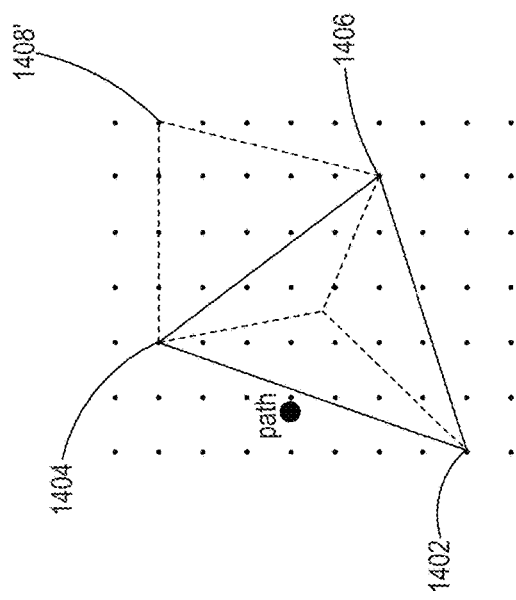
FIGS. 14A-14C are illustrations of another exemplary method for interacting with a triangle pattern, consistent with disclosed embodiments.
Figure 14A:
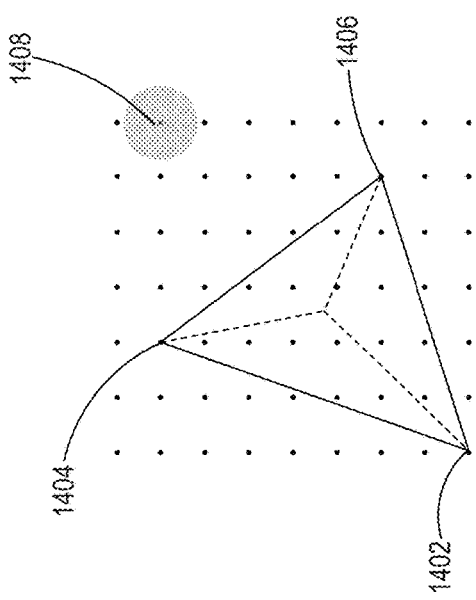
Figure 14C:
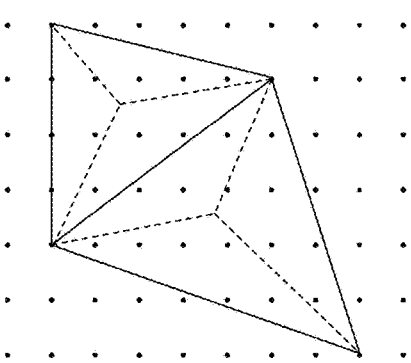

FIGS. 14A to 14C illustrate an exemplary method for adding a node and regenerating a triangle consistent with disclosed embodiments. As shown in FIG. 14A, the user operating a user device(s) 102, 104, 106 may touch a position 1408 on the interactive canvas. Pattern generation system 120 may determine the distances from the surrounding nodes 1402, 1404, 1406 to the position 1408. If the distances are greater than a predetermined threshold T, pattern generation system 120 may add a new node 1408' and generate a new triangle as shown in FIG. 14B. In some embodiments, pattern generation system 120 may generate the new triangle after the user operating a user device(s) 102, 104, 106 releases the selection of position 1408. As shown in FIG. 14C, pattern generation system 120 may generate the internal connecting lines consistent with disclosed embodiments.

Figure 15B:
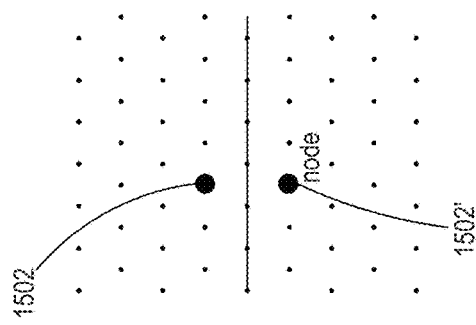
FIGS. 15A-15D are illustrations of an exemplary method for generating a hexagon pattern, consistent with disclosed embodiments.
Figure 15D:
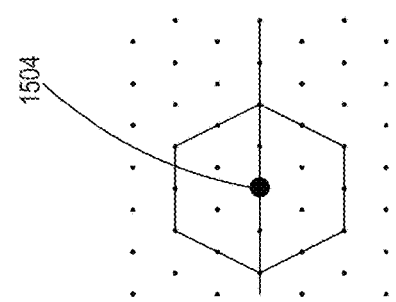
Figure 15A:
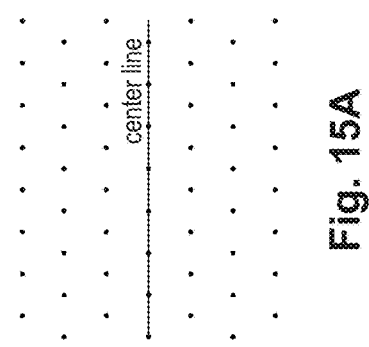
Figure 15C:
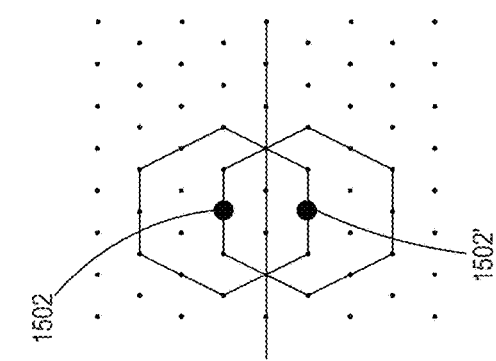

FIGS. 15A to 15D illustrate an exemplary method for generating a hexagon pattern using a unique seed consistent with disclosed embodiments. As shown in FIG. 15A, pattern generation system 120 may determine a central line for generating a hexagon pattern. As shown in FIG. 15B, in some embodiments, pattern generation system 120 may place nodes 1502, 1502' symmetrically to the central line. Alternatively, as shown in FIG. 15D, pattern generation system 120 may place a node 1504 on the central line. Once pattern generation system 120 determines the locations of the nodes on the interactive canvas, system 120 may generate hexagons having the nodes as the center as shown in FIGS. 15C and 15D.

Figure 16B:
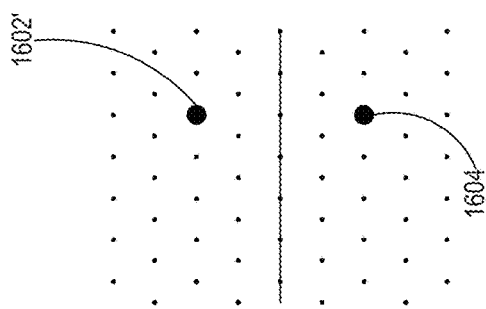
FIGS. 16A-16D are illustrations of exemplary methods for interacting with a hexagon pattern, consistent with disclosed embodiments.
Figure 16D:
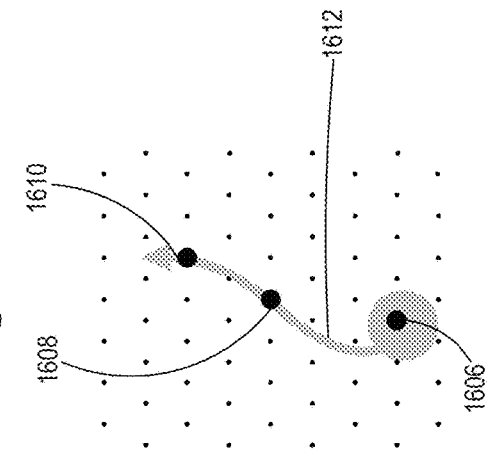
Figure 16A:
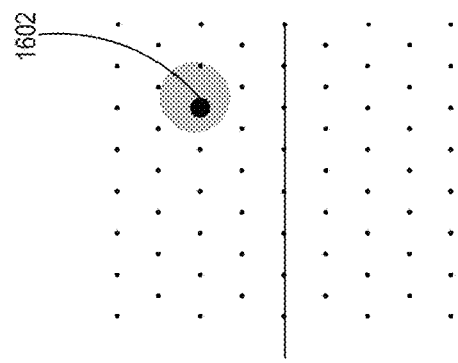
Figure 16C:
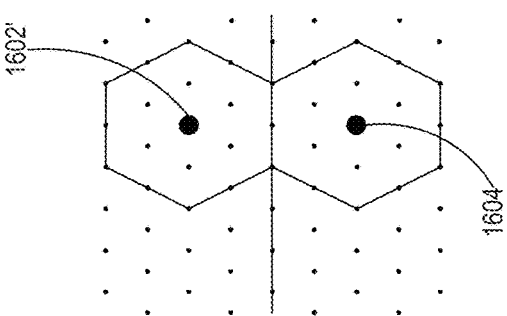

FIGS. 16A to 16D illustrate exemplary methods for interacting with the pattern generation system 120 to generate a hexagon pattern consistent with disclosed embodiments. For example, the visual language for a hexagon pattern is composed of an underlying hexagon grid. As shown in FIG. 16A, the user operating a user device(s) 102, 104, 106 may touch a position 1602 on the interactive canvas. Pattern generation system 120 may automatically place a node 1602' and a symmetric node 1604 as shown in FIG. 16B. As shown in FIG. 16C, pattern generation system 120 may generate a pattern with hexagons having nodes 1602', 1604 at their center.

Alternatively, the user operating a user device(s) 102, 104, 106 may swipe across the interactive canvas as shown in FIG. 16D. Pattern generation system 120 may add new nodes 1606, 1608, 1610 along path 1612. In some embodiments, pattern generation system 120 may space apart nodes 1606, 1608, 1610 at distances according to the manufacturing parameters received from manufacturing system 140. Alternatively, the distance between the nodes may be greater than a predetermined value R. In another embodiment, pattern generation system 120 may remove nodes if a predetermined maximum density has been reached.

Figure 17C:
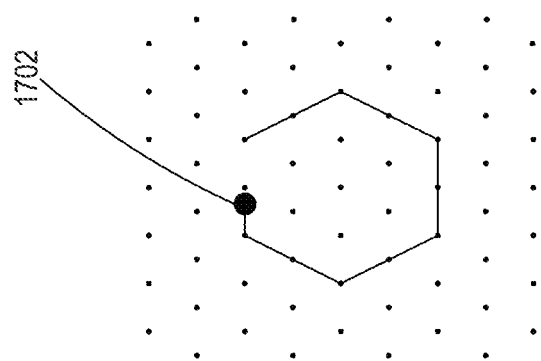
FIGS. 17A-17C are illustrations of another exemplary method for generating a hexagon pattern, consistent with disclosed embodiments.
Figure 17B:
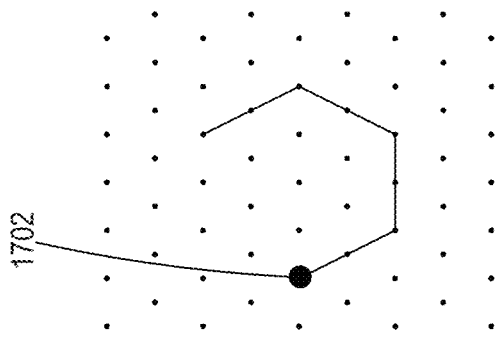
Figure 17A:
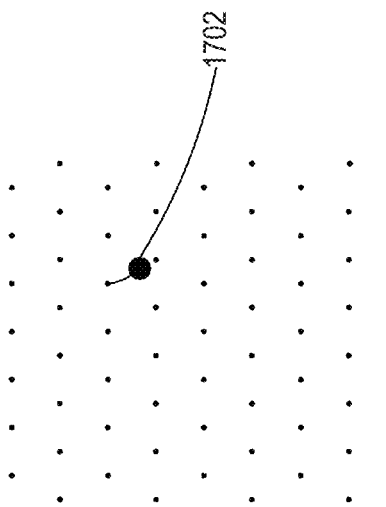

FIGS. 17A to 17C illustrate another exemplary method for generating a hexagon pattern consistent with disclosed embodiments. As shown in FIG. 17A, pattern generation system 120 may generate a "spark" 1702 on the interactive canvas. Pattern generation system 120 may trace the hexagon pattern using the "spark" 1702 on the interactive canvas according to FIGS. 17B and 17C. In some embodiments, pattern generation system 120 may delete a hexagon pattern by reversing the process.

FIGS. 18A to 18C illustrate an exemplary method for generating a chevron pattern consistent with disclosed embodiments. As shown in FIG. 18A, pattern generation system 120 may generate a single chevron pattern 1802 that is symmetric to a central line 1804. According to an exemplary embodiment, the chevron pattern shown in FIG. 18A may be defined by variables including but not limited to central line 1804, width 1806, height 1808 (of the parallelogram), spacing 1810 (between two parallelograms), and angle 1812. As shown in FIG. 18B, pattern generation system 120 may generate multiple chevrons to compose the pattern on the card. In one aspect, pattern generation system 120 may generate chevrons that are parallel to each other. In another aspect, system 120 may generate the adjacent chevrons with an offset 1814. FIG. 18C shows an exemplary chevron pattern as generated by pattern generation system 120.

FIGS. 19A to 19D illustrate exemplary methods for interacting with the pattern generation system 120 to generate a chevron pattern consistent with disclosed embodiments. As shown in FIGS. 19A to 19D, the user operating a user device(s) 102, 104, 106 may drag the chevron pattern. Pattern generation system 120 may interpret the user input to create different effects on the chevron pattern. As shown in FIGS. 19A and 19B, the user operating a user device(s) 102, 104, 106 may drag the edge of chevrons sideways to change the width of the chevrons. In some embodiments, the chevrons may have the same width, so an interaction to change one width will change the width of the other chevrons as well. Alternatively, as shown in FIGS. 19C and 19D, the user operating a user device(s) 102, 104, 106 may drag the pattern sideways to tilt the orientation of the pattern. As shown in FIG. 19D, pattern generation system 120 may tilt all the patterns while maintaining their parallelism.

Alternatively, the user operating a user device(s) 102, 104, 106 may swipe vertically on the center of chevrons to change the offset as shown in FIGS. 20A and 20B. In another aspect, the user operating a user device(s) 102, 104, 106 may drag vertically on the edge of chevrons to change the angle of chevron as shown in FIGS. 21A and 21B.

Figure 22A:
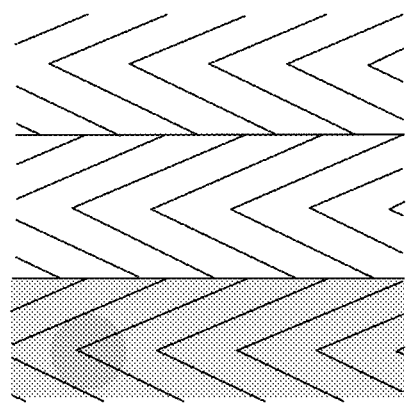
FIGS. 22A-22B are illustrations of another exemplary method for interacting with a chevron pattern, consistent with disclosed embodiments.
Figure 22B:
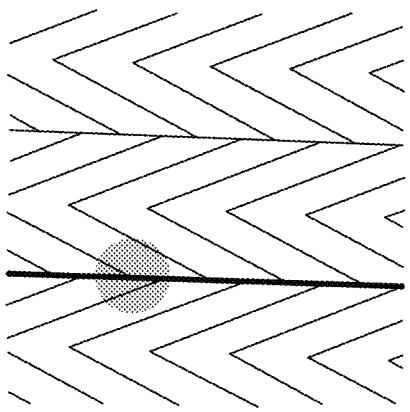

FIGS. 22A and 22B illustrate exemplary methods for providing feedback to the user consistent with disclosed embodiments. For example, the user operating a user device(s) 102, 104, 106 may select the edge of chevrons, and pattern generation system 120 may highlight the edge as a feedback. In another aspect, the user operating a user device(s) 102, 104, 106 may select a portion of the pattern, and pattern generation system 120 may highlight the portion as a feedback of the selection.

Figure 23C:
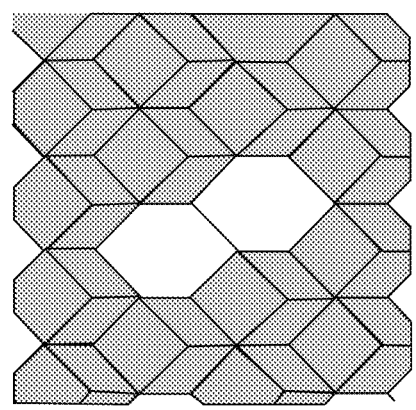
FIGS. 23A-23C are illustrations of an exemplary method for generating a cube pattern, consistent with disclosed embodiments.
Figure 23B:
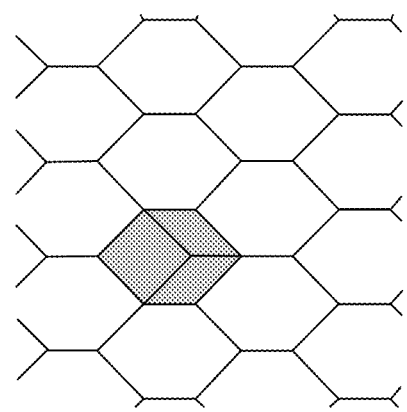
Figure 23A:
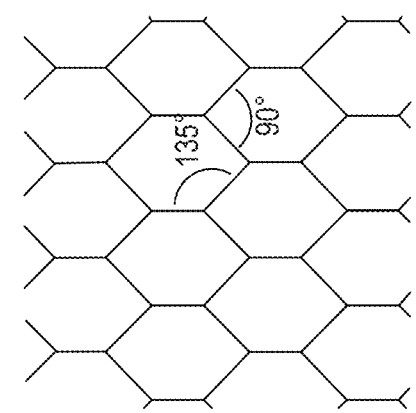

FIGS. 23A to 23C illustrate an exemplary method for generating a cube pattern consistent with disclosed embodiments. As shown in FIG. 23A, the visual language for a cube pattern is composed of an underlying hexagon grid. Within each hexagon cell, pattern generation system 120 generates a "cube" as shown in FIG. 23B. As shown in FIG. 23C, pattern generation system 120 may select specific cells to be empty according to the unique seed and thereby generating a pattern that may be unique.

Figure 25B:
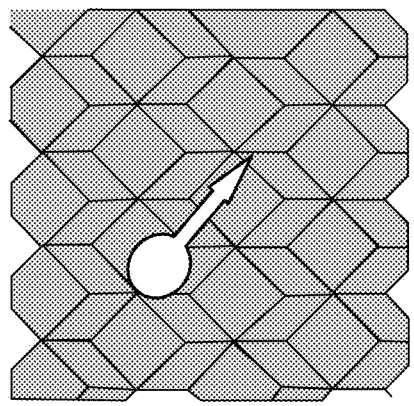
FIGS. 25A-25B are illustrations of another exemplary method for interacting with a cube pattern, consistent with disclosed embodiments.
Figure 25A:
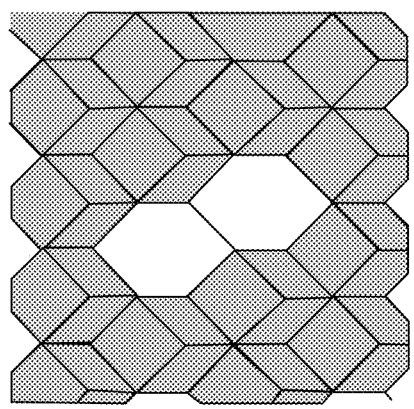

FIGS. 24A and 24B illustrate an exemplary method for interacting with a cube pattern consistent with disclosed embodiments. For example, the user operating a user device(s) 102, 104, 106 may tap on a vacant cell on the interactive canvas, and pattern generation system 120 may fill the cell with a "cube." Alternatively, the user operating a user device(s) 102, 104, 106 may tap on a "cube" to remove it from the pattern. In some embodiments, the user operating a user device(s) 102, 104, 106 may swipe across the interactive canvas as shown in FIGS. 25A and 25B. Pattern generation system 120 may receive the user input and automatically remove cubes or add cubes to generate the unique pattern.

FIG. 26 illustrates an exemplary method for providing feedback to the user consistent with disclosed embodiments. For example, pattern generation system 120 may receive user input from the user device(s) 102, 104, 106 at cell location 2602. Using cell location 2602, pattern generation system 120 may change the shading of the surrounding cells to create a "glowing" effect on the pattern. Because the "glowing" effect is determined based on the user input, the user operating the user device(s) 102, 104, 106 may feel that the pattern is responsive.

Figure 27:
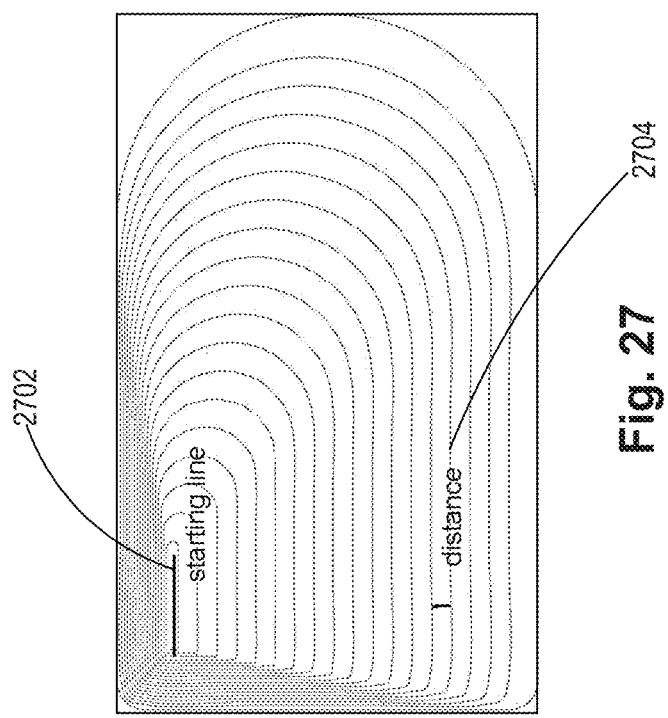
FIG. 27 is an illustration of an exemplary method for generating a line pattern, consistent with disclosed embodiments.

FIG. 27 illustrates an exemplary method for generating a line pattern, consistent with disclosed embodiments. As shown in FIG. 27, pattern generation system 120 may generate a line pattern using variables including but not limited to a starting line 2702 and distance 2704. Using these variables, pattern generation system 120 may show loops transitioning form the starting line to the contour of a defined boundary. In some embodiments, pattern generation system 120 may maintain a consistent distance between the loops.

Figure 28B:
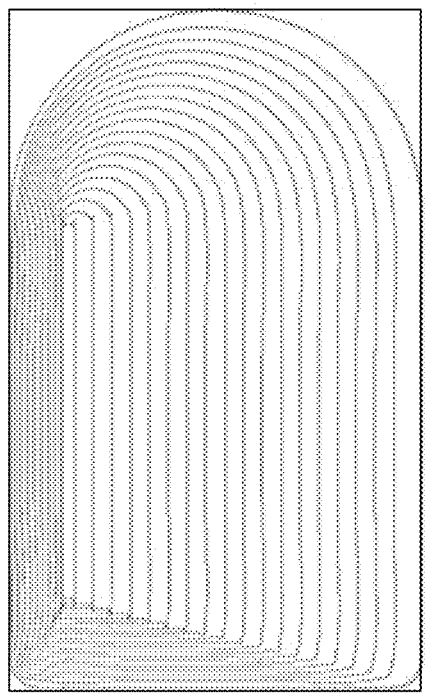
FIGS. 28A-28B are illustrations of an exemplary method for interacting with a line pattern, consistent with disclosed embodiments.
Figure 28A:
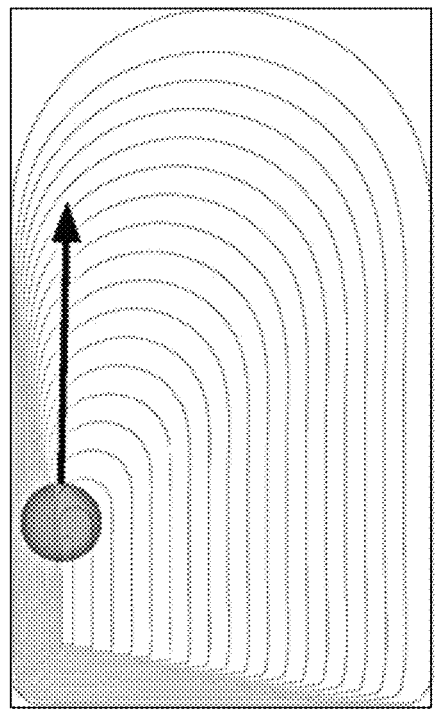
Figure 29B:
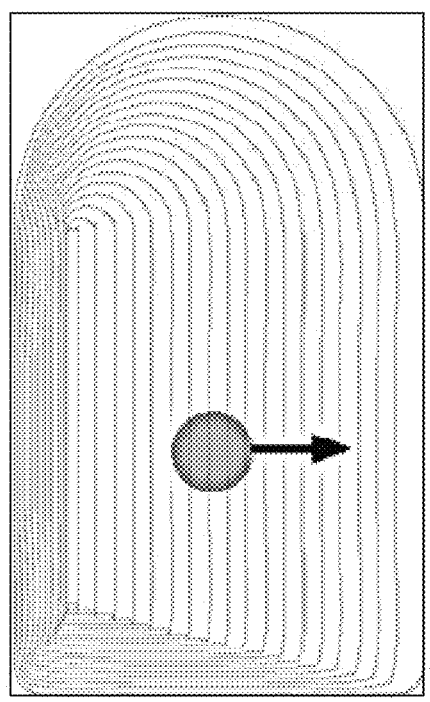
FIGS. 29A-29B are illustrations of another exemplary method for interacting with a line pattern, consistent with disclosed embodiments.
Figure 29A:
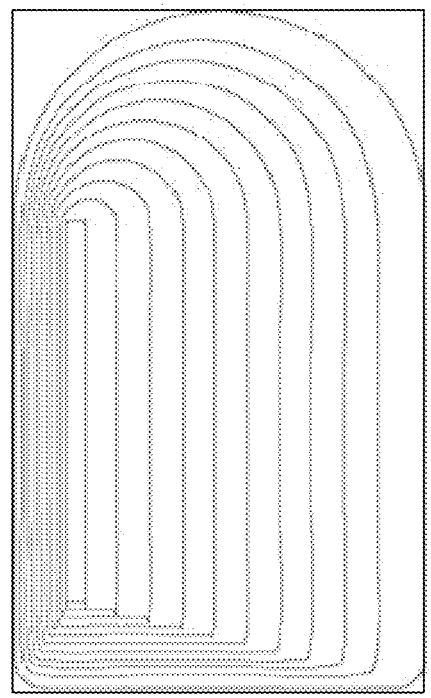

FIGS. 28 and 29 illustrate exemplary methods for interacting with a line pattern, consistent with disclosed embodiments. As shown in FIGS. 28A and 28B, the user operating the user device(s) 102, 104, 106 may interact with the ends of the starting line to extend or shrink the length of the starting line. Pattern generation system 120 may receive the user input from the user device(s) 102, 104, 106 and update the pattern accordingly. Alternatively, as shown in FIGS. 29A and 29B, the user operating the user device(s) 102, 104, 106 may interact with the loops to cause the loop distance to grow bigger or smaller. Pattern generation system 120 may receive the user input from the user device(s) 102, 104, 106 and update the pattern accordingly.

Figure 30:
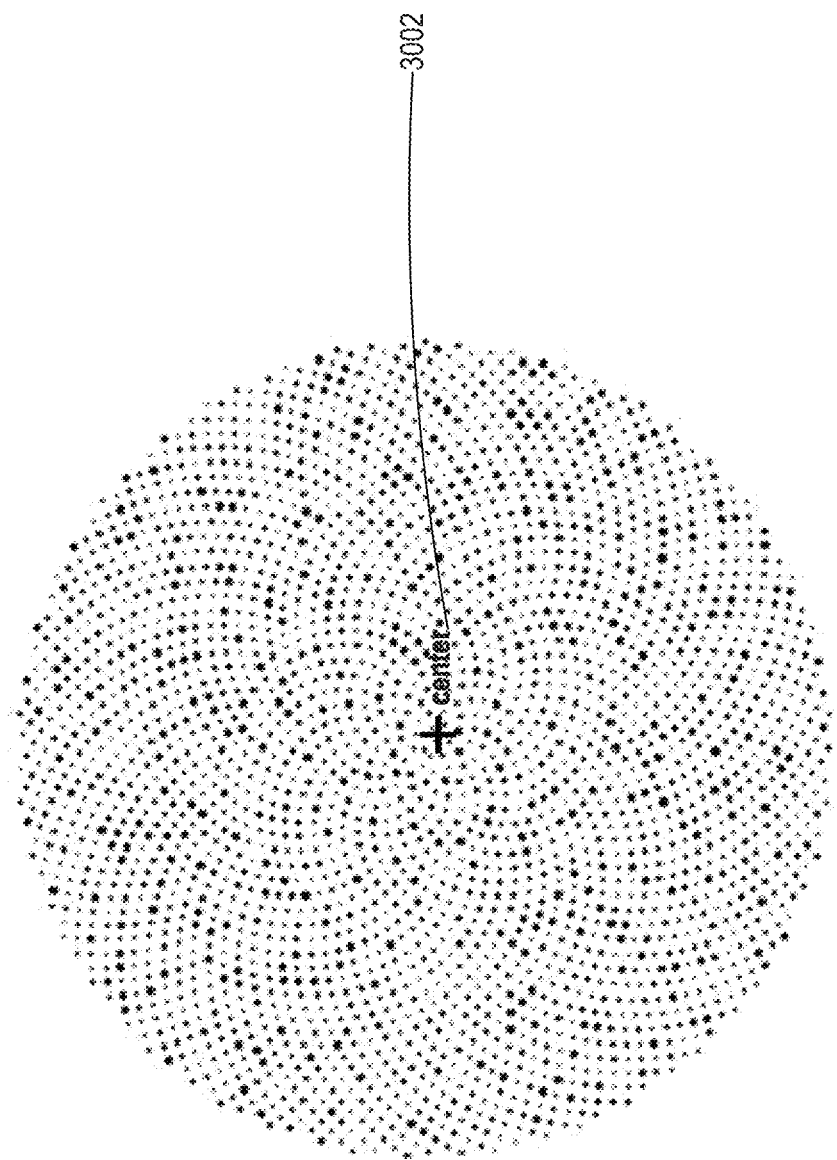
FIG. 30 is an illustration of an exemplary method for generating a circle pattern, consistent with disclosed embodiments.

FIG. 30 illustrates an exemplary method for generating a circle pattern, consistent with disclosed embodiments. Pattern generation system 120 may use the unique seed to determine the center point 3002 for the circle arrangement. In some embodiments, pattern generation system 120 may use a Fibonacci pattern to generate the initial circle arrangement as shown in FIG. 30. Alternatively, pattern generation system 120 may use other known techniques to generate the initial circle arrangement. Each circle size may be predetermined by pattern generation system 120 or may be randomly generated by pattern generation system 120.

Figure 31B:
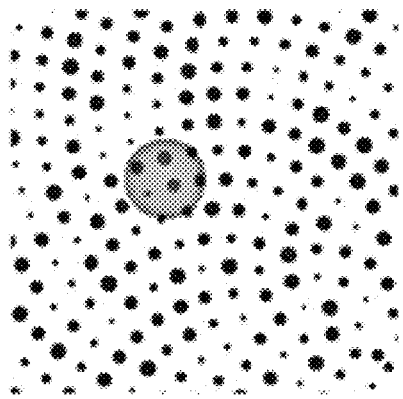
FIGS. 31A-31B are illustrations of an exemplary method for interacting with a circle pattern, consistent with disclosed embodiments.
Figure 31A:
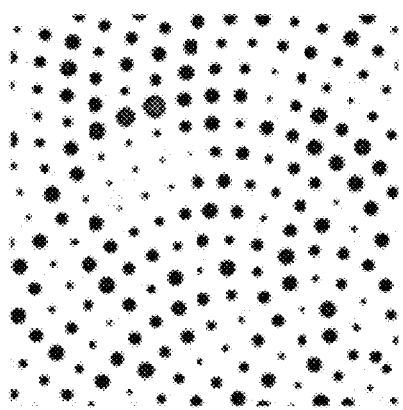

FIGS. 31A and 31B illustrate an exemplary method for interacting with a circle pattern consistent with disclosed embodiments. As shown in FIGS. 31A and 31B, the user operating the user device(s) 102, 104, 106 may interact with the circle pattern either by tapping on or swiping across the canvas. In some embodiments, pattern generation system 120 may use the user input as a repeller to push the circles out of the way. As shown in FIG. 31B, the circles directly affected by the user input get smaller, while the nearby circles outside of the "effect zone" get larger. In other words, pattern generation system 120 may maintain the total area of the filled circles within a certain area and redistribute the area among the affected circles.

Besides the exemplary embodiments previously disclosed, pattern generation system 120 may also contain additional functions to allow a user operating the user device(s) 102, 104, 106 to store the interactive pattern for future use. For example, pattern generation system 120 may automatically store each variation of the pattern during and after each step of the design process. By storing each variation, pattern generation system 120 allows the user to undo a change or return to a previous pattern. Alternatively, pattern generation system 120 may receive user input from the user device(s) 102, 104, 106 to store a specific pattern or to retrieve a specific pattern. In another embodiment, pattern generation system 120 may include a social-sharing feature that allows a user using the user device(s) 102, 104, 106 to share the pattern with a family or friend for further modification.

Besides providing a user participatory design environment, the disclosed embodiments also provide an identification and security feature. A typical transaction card often includes, for example, a three or four-digit security code printed on the card. Consistent with the disclosed embodiments, the unique identifier may act as an additional security feature. In particular, because the generated pattern printed on the transaction card may represent the underlying unique identifier, the unique pattern on the card may provide an additional layer of security. For example, in an exemplary method of securing online transactions, a user may operate a user device(s) 102, 104, 106 to capture an image of the transaction card to authorize an online transaction. In another aspect, financial transaction devices 130, 132, or 134 may secure in-person transactions by utilizing apparatus or software to decode the graphical pattern to extract the security code. Alternatively, financial transaction devices 130, 132, or 134 may engage a secure transfer of an image of the graphical pattern to the issuer of the transaction card via network 110 for decoding.

Alternatively or additionally, the pattern may also be used for website authentication. For example, many online websites now display a personalized security image to confirm the validity of the websites. The selection of personalized security images, however, may be limited. By using the unique pattern associated to the user, the websites may provide limitless security images and ensure its users are accessing valid websites to avoid phishing attacks. For example, a user may operate a user device(s) 102, 104, 106 to access a website related to a financial institution, and the personalized security image displayed may be an image of the user's unique pattern. Because each pattern may be unique to the user, the user may be assured of the legitimacy of the website.

Other embodiments will be apparent to those skilled in the art from consideration of the specification and practice of the disclosed embodiments. It is intended that the specification and examples be considered as exemplary only, with a true scope and spirit of the disclosed embodiments being indicated by the following claims. While the disclosed embodiments have been discussed with respect to transaction cards for ease of discussion, one skilled in the art will appreciate the useful applications of the pattern generation outside of transaction cards. For example, user identification cards including, but not limited to, student identification cards, library cards, store rewards cards, and the like, may be a possible application of the disclosed embodiments. Furthermore, although aspects of the disclosed embodiments are described as being associated with data stored in memory and other tangible computer-readable storage mediums, one skilled in the art will appreciate that these aspects can be stored on and executed from many types of tangible computer-readable media. Further, certain processes and steps of the disclosed embodiments are described in a particular order, one skilled in the art will appreciate that practice of the disclosed embodiments are not so limited and could be accomplished in many ways. Accordingly, the disclosed embodiments are not limited to the above-described examples, but instead are defined by the appended claims in light of their full scope of equivalents.

Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for providing an interactive design environment, comprising:
   a transaction card;
   a memory storing executable instructions; and
   at least one processor configured to execute the stored instructions to:
   receive an initial identifier associated with a user;
   determine, based on a comparison with known identifiers stored in a database, whether the initial identifier is different from the known identifiers;

generate, based on the determination, a unique identifier using the received initial identifier;

generate an interactive graphical pattern using the generated unique identifier, the interactive graphical pattern comprising a plurality of predefined geometric shapes;

receive a first user input altering a first portion of the interactive graphical pattern;

automatically regenerate a second portion of the interactive graphical pattern;

receive a second user input subsequent to the automatically regenerated second portion of the interactive graphical pattern; and initiate application of the interactive graphical pattern onto a surface of the transaction card.

2. The system of claim 1, wherein the at least one processor is further configured to: receive a selection of predefined geometric shape for generating the interactive graphical pattern.

3. The system of claim 1, wherein the at least one processor is further configured to: check the interactive graphical pattern against existing patterns to ensure uniqueness.

4. The system of claim 1, wherein the interactive graphical pattern further comprises a plurality of nodes and lines.

5. The system of claim 1, wherein generating the interactive graphical pattern includes fabrication constraints.

6. The system of claim 1, wherein the at least one processor is further configured to: decode the interactive graphical pattern to extract the unique identifier.

7. The system of claim 1, wherein the at least one processor is further configured to: identify key locations to extract a unique seed.

8. A method for providing an interactive design environment, comprising:

receiving a transaction card;

receiving an initial identifier associated with a user;

determining, based on a comparison with known identifiers stored in a database, whether the initial identifier is different from the known identifiers;

generating, based on the determination, a unique identifier using the received initial identifier;

generating an interactive graphical pattern using the unique identifier, the interactive graphical pattern comprises a plurality of predefined geometric shapes;

receiving a first user input altering a first portion of the interactive graphical pattern;

automatically regenerating a second portion of the interactive graphical pattern;

receiving a second user input subsequent to the automatically regenerated second portion of the interactive graphical pattern; and initiating application of the interactive graphical pattern onto a surface of the transaction card.

9. The method of claim 8, further comprising:
selecting a predefined geometric shape for generating the interactive graphical pattern.

10. The method of claim 8, further comprising:
checking the interactive graphical pattern against existing pattern to ensure uniqueness.

11. The method of claim 8, wherein the interactive graphical pattern further comprises a plurality of nodes and lines.

12. The method of claim 8, wherein generating the interactive graphical pattern includes fabrication constraints.

13. The method of claim 8, further comprising:
decoding the interactive graphical pattern to extract the unique identifier.

14. The method of claim 8, further comprising: identifying key locations to extract a unique seed.

15. A non-transitory computer-readable medium having stored instructions which when executed cause at least one processor to perform a method for providing an interactive design environment, comprising:

receiving a transaction card;

receiving an initial identifier associated with a user;

determining, based on a comparison with known identifiers stored in a database, whether the initial identifier is different from the known identifiers;

generating, based on the determination, a unique identifier using the received initial identifier;

generating an interactive graphical pattern using the unique identifier, the interactive graphical pattern comprises a plurality of predefined geometric shapes;

receiving a first user input altering a first portion of the interactive graphical pattern;

automatically regenerating a second portion of the interactive graphical pattern;

receiving a second user input subsequent to the automatically regenerated second portion of the interactive graphical pattern; and initiating application of the interactive graphical pattern onto a surface of the transaction card.

16. The non-transitory computer-readable medium of claim 15, the method further comprising: selecting a predefined geometric shape for generating the interactive graphical pattern.

17. The non-transitory computer readable medium of claim 15, the method further comprising: checking the interactive graphical pattern against existing pattern to ensure uniqueness.

18. The non-transitory computer-readable medium of claim 15, wherein the interactive graphical pattern further comprises a plurality of nodes and lines.

19. The non-transitory computer-readable medium of claim 15, wherein generating the interactive graphical pattern includes fabrication constraints.

20. The non-transitory computer-readable medium of claim 15, the method further comprising: decoding the interactive graphical pattern to extract the unique identifier.

* * * * *